(12) United States Patent
Nishant et al.

(10) Patent No.: US 12,526,697 B2
(45) Date of Patent: Jan. 13, 2026

(54) METHOD AND SYSTEM FOR INITIATING CELL TRANSITION ACTIVITIES DURING MULTICAST AND BROADCAST SERVICES

(71) Applicant: SAMSUNG ELECTRONICS CO., LTD., Suwon-si (KR)

(72) Inventors: Nishant, Bangalore (IN); Sidhant Jain, Bangalore (IN); Gokul K, Bangalore (IN); Kailash Kumar Jha, Bangalore (IN); Mohammad Umair, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 354 days.

(21) Appl. No.: 18/297,147

(22) Filed: Apr. 7, 2023

(65) Prior Publication Data
US 2024/0056903 A1   Feb. 15, 2024

Related U.S. Application Data

(63) Continuation of application No. PCT/KR2023/004215, filed on Mar. 29, 2023.

(30) Foreign Application Priority Data

Aug. 12, 2022   (IN) .............................. 202241046155

(51) Int. Cl.
*H04W 36/00* (2009.01)
*H04W 36/08* (2009.01)

(52) U.S. Cl.
CPC . *H04W 36/0007* (2018.08); *H04W 36/00835* (2018.08); *H04W 36/08* (2013.01)

(58) Field of Classification Search
None
See application file for complete search history.

(56) References Cited

U.S. PATENT DOCUMENTS

| | | |
|---|---|---|
| 10,952,182 B2 | 3/2021 | Wang et al. |
| 2012/0236776 A1 | 9/2012 | Zhang et al. |
| (Continued) | | |

FOREIGN PATENT DOCUMENTS

| | | |
|---|---|---|
| CN | 112954617 A | 6/2011 |
| CN | 103200293 A | 7/2013 |
| (Continued) | | |

OTHER PUBLICATIONS

PCT International Search Report dated Jun. 27, 2023 for PCT/KR2023/004215.

(Continued)

*Primary Examiner* — Clemence S Han
(74) *Attorney, Agent, or Firm* — NIXON & VANDERHYE P.C.

(57) ABSTRACT

A method and/or system for initiating one of a plurality of cell transition activities for a UE supporting multicast and broadcast services (MBS). The technique may include identifying, by the UE, one or more candidate cells available for one of the plurality of cell transition activities for the UE. The technique may include identifying, by the UE, at least one candidate cell among the one or more candidate cells that support MBS. The technique may include initiating, by the UE, one of the plurality of cell transition activities for the UE using the at least one candidate cell.

18 Claims, 29 Drawing Sheets

(56) References Cited

U.S. PATENT DOCUMENTS

| | | | |
|---|---|---|---|
| 2012/0320814 A1 | 12/2012 | Chen et al. | |
| 2013/0149989 A1 | 6/2013 | Kwon et al. | |
| 2015/0373638 A1 | 12/2015 | Zhang et al. | |
| 2019/0069205 A1 | 2/2019 | Lee et al. | |
| 2021/0360495 A1 | 11/2021 | Lovlekar et al. | |
| 2022/0295318 A1 | 9/2022 | Hwang et al. | |
| 2023/0199569 A1* | 6/2023 | Cao | H04W 4/06 370/331 |
| 2023/0199619 A1 | 6/2023 | Li et al. | |
| 2023/0300681 A1* | 9/2023 | Liu | H04W 36/38 370/331 |
| 2023/0345328 A1 | 10/2023 | Nishant et al. | |
| 2023/0422136 A1* | 12/2023 | Dai | H04W 36/362 |
| 2024/0172175 A1* | 5/2024 | Li | H04L 12/189 |

FOREIGN PATENT DOCUMENTS

| | | |
|---|---|---|
| CN | 102714835 B | 6/2015 |
| CN | 111034277 B | 4/2022 |
| KR | 10-2007-0030516 A | 3/2007 |
| KR | 10-2013-0063839 A | 6/2013 |
| KR | 10-2013-0087866 A | 8/2013 |
| WO | WO 2021/029686 A1 | 2/2021 |
| WO | WO 2022/037706 A1 | 2/2022 |
| WO | 2022087253 A1 | 4/2022 |
| WO | WO 2022-082567 A1 | 4/2022 |
| WO | WO 2022-082570 A1 | 4/2022 |
| WO | WO 2022-083618 A1 | 4/2022 |
| WO | WO 2022-154488 A1 | 7/2022 |

OTHER PUBLICATIONS

PCT Written Opinion dated Jun. 27, 2023 for PCT/KR2023/004215.
Technical Specification—3rd Generation Partnership Project; Technical Specification Group Radio Access Network; NR; 3GPP TS 38.331v17.0.0, NR; Radio Resource Control (RRC), Protocol specification, Jul. 19, 2022, 1273 pages.
Extended European Search Report for EP Application No. 23852665.1 dated Jul. 14, 2025, 10 pages.

* cited by examiner

METHOD AND SYSTEM FOR INITIATING CELL TRANSITION ACTIVITIES DURING MULTICAST AND BROADCAST SERVICES

CROSS-REFERENCE TO RELATED APPLICATIONS

This application is a continuation of International Application No. PCT/KR2023/004215 designating the United States, filed on Mar. 29, 2023, in the Korean Intellectual Property Receiving Office and claiming priority to Indian Provisional Patent Application No. 202241046155 filed on Aug. 12, 2022, and Indian Complete Patent Application No. 202241046155 filed on Feb. 13, 2023 in the Indian Patent Office, the disclosures of each of which are incorporated by reference herein in their entireties.

FIELD

Various example embodiments generally relate to systems and/or methods for initiating one of a plurality of cell transition activities for a user equipment (UE) supporting multicast and broadcast services (MBS).

BACKGROUND

The drastic increase in the different varieties of devices with specific service needs in the modern world has created a demand for 5G communication systems to align with these specific service requirements. Taking this into consideration, the evolution path of 5G communication systems focuses on enabling new service capabilities and advanced features. One of the interesting features is the support of MBS in 5G. Using MBS, a device can get the multicast and broadcast services seamlessly. MBS is considered one of the most promising use cases of 5G communication systems that improve user experience and network efficiency when transmitting the same content to multiple users.

In 3GPP Release-17, MBS broadcast configuration information is provided on a multicast control channel (MCCH) logical channel. The MCCH carries the MBSBroadcastConfiguration message which indicates the MBS broadcast sessions that are provided in the cell as well as the corresponding scheduling-related information for these sessions. Further, the system information block (SIB 20) carries MCCH information which provides MBS broadcast configuration information. Additionally, SIB21 provides information related to the service continuity of MBS broadcasts. These SIBs are defined in 3GPP TS 38.331v17.0.0 for MBS-related configurations and services. The UE applies the MCCH information acquisition procedure to acquire the MBS broadcast configuration information broadcasted by the network.

FIGS. 1A and 1B illustrate a signal diagram for receiving MBS configuration information, in accordance with existing art.

For example, as shown in FIG. 1(a), the UE 110 acquires SIB1 from a network 120 at operation 101 and the UE 110 transmits MBS interest indication to the network 120 at operation 102. Then, as shown in FIG. 1(b), the UE 110 acquires MBSBroadcastConfiguration from the network 120 at operation 103. The procedure applies to MBS capable UEs interested to receive MBS broadcast services that are in RRC_IDLE, RRC_INACTIVE or RRC_CONNECTED state. Optionally, the MBSBroadcastConfiguration message may also contain a list of neighbour cells providing the same broadcast MBS(s) as provided in the current cell. After acquiring the MBS broadcast configuration information, the UE informs the network about its interest to receive MBS broadcast services and to inform the network about the priority of MBS broadcast versus unicast reception. The configuration information required by the UE to receive MCCH is provided in SIB20. Hence, in new radio (NR)/5G, master information block (MIB) and system information block1 (SIB1) are the minimum required system information (SI) to camp on a cell. The UE needs to mandatorily decode MIB and SIB1 to camp on a cell. Other system information messages are known as remaining system information (RMSI) or other system information (OSI). SIB1 carries scheduling information of other SIBs in the cell. Hence, the UE knows which all SIBs are present/supported in an NR cell using SIB1 SI scheduling information. Using the SIB1 SI scheduling information, the UE can determine whether SIB20/SIB21 is present or not in the NR cell.

Further, different types of devices such as data-centric live stream tablet devices, television screens in transport systems like trains and buses, advertising screens in public places, etc., may intensively use these broadcast services. For these devices, it is essential that they connect to 5G cells supporting MBS. Hence, MBS are significant use cases of 5G for different types of devices like entertainment systems in trains/buses/cars, live-streaming tablet devices, etc. It is essential that the MBS preferred devices should camp and connect to 5G cell supporting MBS to avail the MBS. However, as per current 3GPP standards, UE camps on a cell during cell selection based on signal strength.

FIG. 2 illustrates a network environment of performing cell transition activities to a cell not supporting MBS, in accordance with existing art.

As, shown in FIG. 2, the camped cell such as gNB2 may not be supporting the MBS while other cells in the location may support the MBS such as gNB3. So, if an MBS preferred UE 201 camps on a cell not supporting MBS, then the UE 201 will not be able to get MBS. However, the UE 201 will be able to get the service once it moves to the cell supporting MBS through reselection or handover. Thus, although the UE 201 prefers MBS, the existing techniques may lead the UE 201 to camp on a cell that won't be supporting MBS. Further, during cell reselection, there can be multiple cells that may be satisfying the reselection criterion and out of these neighbour cells, some will be supporting MBS, while some may not be supporting. If the UE 201 moves to a non-MBS supporting cell, the UE 201 won't be able to avail MBS even if MBS supported cells are available.

During handover, when UE is configured with neighbour measurement objects, UE sends a measurement report for all the detected cells in the measurement object based on signal strength. This may result in UE receiving handover to a cell that doesn't support MBS although MBS supporting suitable cells are available for the UE.

During Redirection, the network configures NR frequencies in a radio resource control (RRC) Release message for camping. From the list of identified cells in redirected frequencies, the UE selects a suitable cell based on signal conditions. As a result, the UE may camp on a non-MBS supporting cell where the UE would not be able to avail MBS although MBS supporting cells are available for the UE to choose thus may lead to a poor user experience.

Similarly, during an IRAT-handover case, based on the UE reporting of NR cells, LTE serving eNB evaluates the measurement reports and sends MobilityFromEUTRACommand. The UE may be handed over to a cell that does not support MBS. This results in the UE not being able to avail MBS although MBS supported cells are present.

So, in the existing techniques, MBS preferred UE does not consider the presence of 3GPP Release-17 MBS support in neighbour cells when it moves from a serving cell to another cell. So, even if there is a possibility for the UE to move to a cell with MBS, the UE may be neglecting the opportunity and choose other cells.

Hence, there is a need to provide techniques to overcome the above-discussed problems.

SUMMARY

This summary is provided to introduce a selection of concepts in a simplified format that are further described in the detailed description. This summary is not intended to identify key or essential inventive concepts, nor is it intended for determining the scope of invention.

In an example embodiment, a method for initiating one of a plurality of cell transition activities for a UE supporting multicast and broadcast services (MBS), may be provided. The method may comprise identifying, by the UE, one or more candidate cells available for one of the plurality of cell transition activities for the UE. The method may further comprise identifying, by the UE, at least one candidate cell among the one or more candidate cells that support MBS. The method may comprise initiating, by the UE, one of the plurality of cell transition activities for the UE using the at least one candidate cell.

In an example embodiment, a system for initiating one of a plurality of cell transition activities for a UE supporting multicast and broadcast services (MBS), may be provided. The system may comprise a memory and a processor coupled to the memory. The processor may be configured to identify one or more candidate cells available for one of the plurality of cell transition activities for the UE, identify at least one candidate cell among the one or more candidate cells that support MBS, and initiate one of the plurality of cell transition activities for the UE using the at least one candidate cell.

To further clarify the advantages and/or features, a more particular example description will be rendered by reference to specific example embodiments thereof, which is illustrated in the appended drawing. It is appreciated that these drawings depict only typical and/or example embodiments and are therefore not to be considered limiting its scope.

BRIEF DESCRIPTION OF THE DRAWINGS

These and other features, aspects, and advantages will become better understood when the following detailed description is read with reference to the accompanying drawings in which like characters represent like parts throughout the drawings, wherein.

Figure 1A:
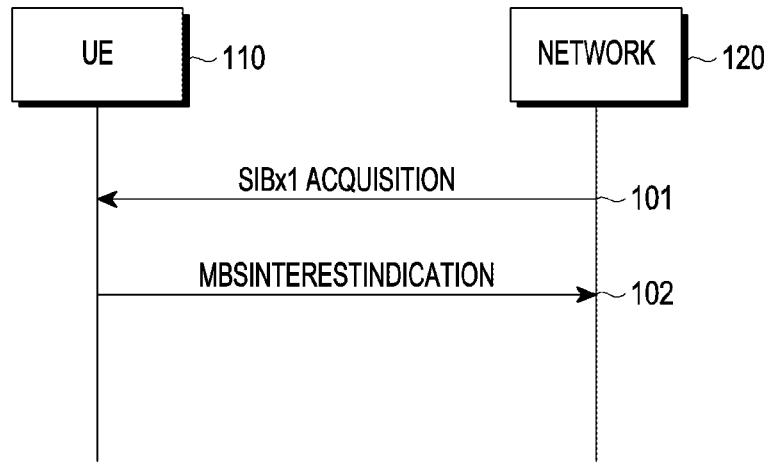
FIGS. 1A and 1B illustrate a signal diagram for receiving MBS configuration information, in accordance with existing art.
Figure 1B:
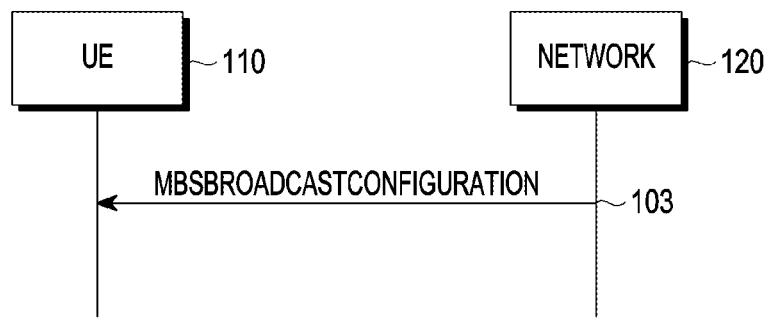
Figure 2:
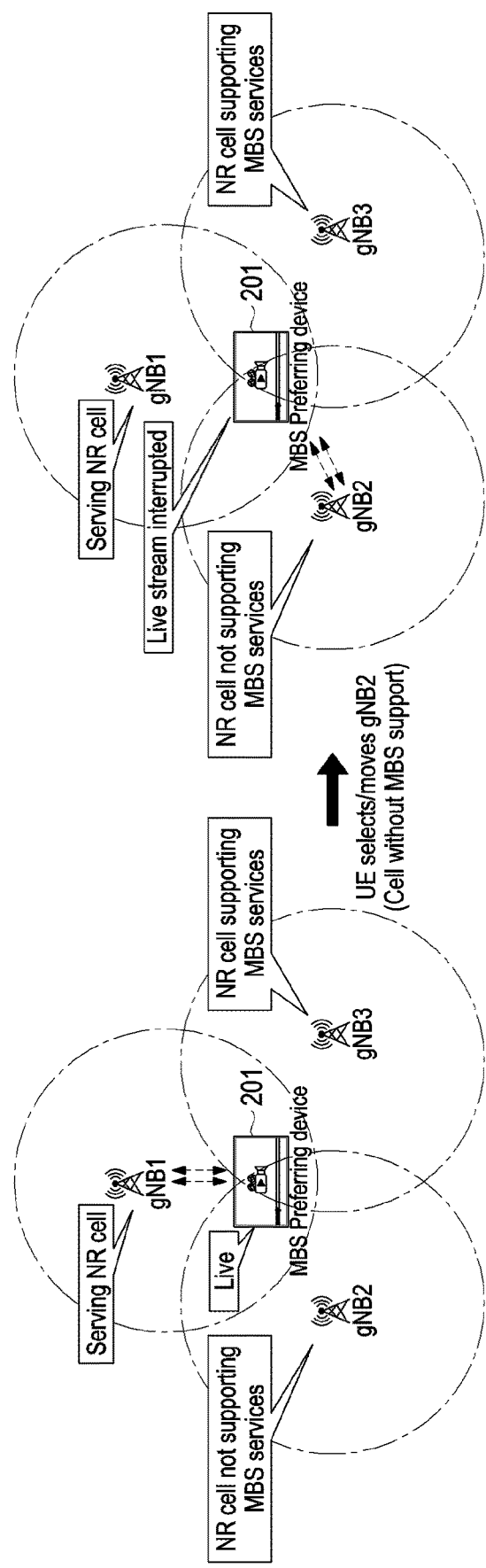
FIG. 2 illustrates a network environment of performing cell transition activities to a cell not supporting MBS, in accordance with existing art.

Further, skilled artisans will appreciate that elements in the drawings are illustrated for simplicity and may not have been necessarily drawn to scale. For example, the flow charts illustrate the method in terms of the most prominent steps involved to help to improve understanding. Furthermore, in terms of the construction of the device, one or more components of the device may have been represented in the drawings by conventional symbols, and the drawings may show only those specific details that are pertinent to understanding so as not to obscure the drawings with details that will be readily apparent to those of ordinary skill in the art having the benefit of the description herein.

DETAILED DESCRIPTION

To promote an understanding, reference will now be made to the example embodiments illustrated in the drawings and specific language will be used to describe the same. It will nevertheless be understood that no limitation of the scope is thereby intended, such alterations and further modifications in the illustrated system, and such further applications as illustrated therein being contemplated as would normally occur to one skilled in the art.

It will be understood by those skilled in the art that the foregoing general description and the following detailed description are explanatory and are not intended to be restrictive thereof.

Reference throughout this specification to "an aspect", "another aspect" or similar language means that a particular feature, structure, or characteristic described in connection with the embodiment is included in at least one embodiment. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

It should be noted that the "UE" referred to throughout the description and drawings is an MBS preferred UE or a UE which supports MBS. The present disclosure relates to techniques for initiating one of a plurality of cell transition activities in a UE supporting multicast and broadcast services (MBS). The plurality of cell transition activities may include cell selection, cell reselection, cell redirection, handover, and inter-radio access technology (IRAT) handover.

MBS has been introduced in 3GPP Release-17 NR specifications and there is a significant increase in the use of MBS. With a significant use case on 5G MBS, it is essential that an MBS preferred UE camps on an MBS supporting 5G cell during any of the plurality of cell transition activities. However, as per the existing art, although the UE prefers MBS, the UE may select a cell which does not support MBS during any of the plurality of cell transition activities, as discussed in detail with respect to FIGS. 3-7.

Figure 3:
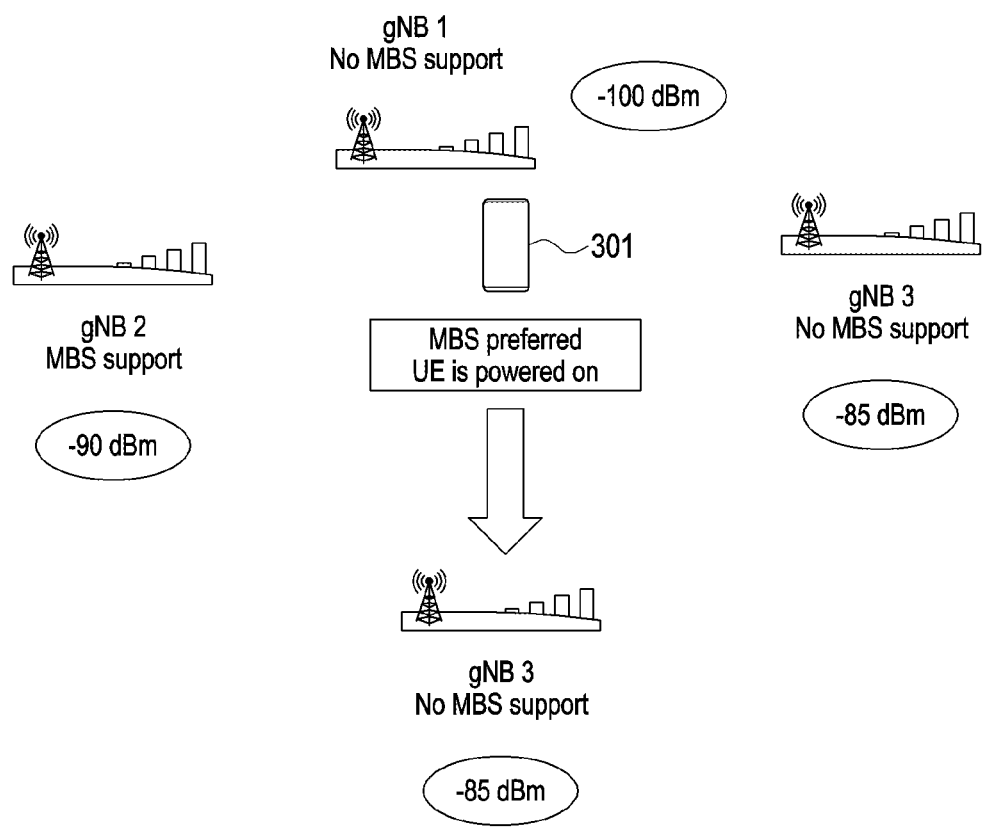
FIG. 3 illustrates a network environment for cell selection to a cell not supporting MBS, in accordance with existing art.

FIG. 3 illustrates a network environment for cell selection to a cell not supporting MBS, in accordance with existing art. As known to a person skilled in the art, an MBS preferred UE 301 performs cell selection procedure during power-on or no service cases. Even when the UE 301 is moving from Non-3GPP (e.g., Wi-Fi) to a 3GPP (NR) cell, then also cell selection is performed. Accordingly, the UE 301 scans NR frequencies to identify deployed NR cells. The UE 301 performs the cell suitability check and reads mandatory Minimum SIB s (MIB and SIB1) for camping on a cell. Currently, the UE 301 camps on detected suitable cells based on the cell selection criterion (S-criterion), and no other checks are being performed by the UE. Even though there can be multiple suitable cells for camping, the UE 301 does not evaluate other cells and camps on the first or strongest detected cell. For example, as shown in FIG. 3, during the cell selection scan, the UE 301 found 3 suitable cells—gNb1, gNB2, and gNB3. Among these, gNB2 may support Release-17 MBS while the other two gNBs (gNB1 and gNB3) do not support MBS. The UE 301 camps on non-MBS supporting cells (e.g., gNB3) based on signal strength criterion. Although there are other suitable cells available that support (e.g., gNB2) MBS, the UE 301 camps on non-MBS supporting cells. As per current behaviour, the UE 301 performs camping during cell selection based on the signal strength and no other features support, such as MBS support, are considered for camping. As a result, the UE 301 discards the chance of availing MBS and impacting the user experience.

Figure 4:
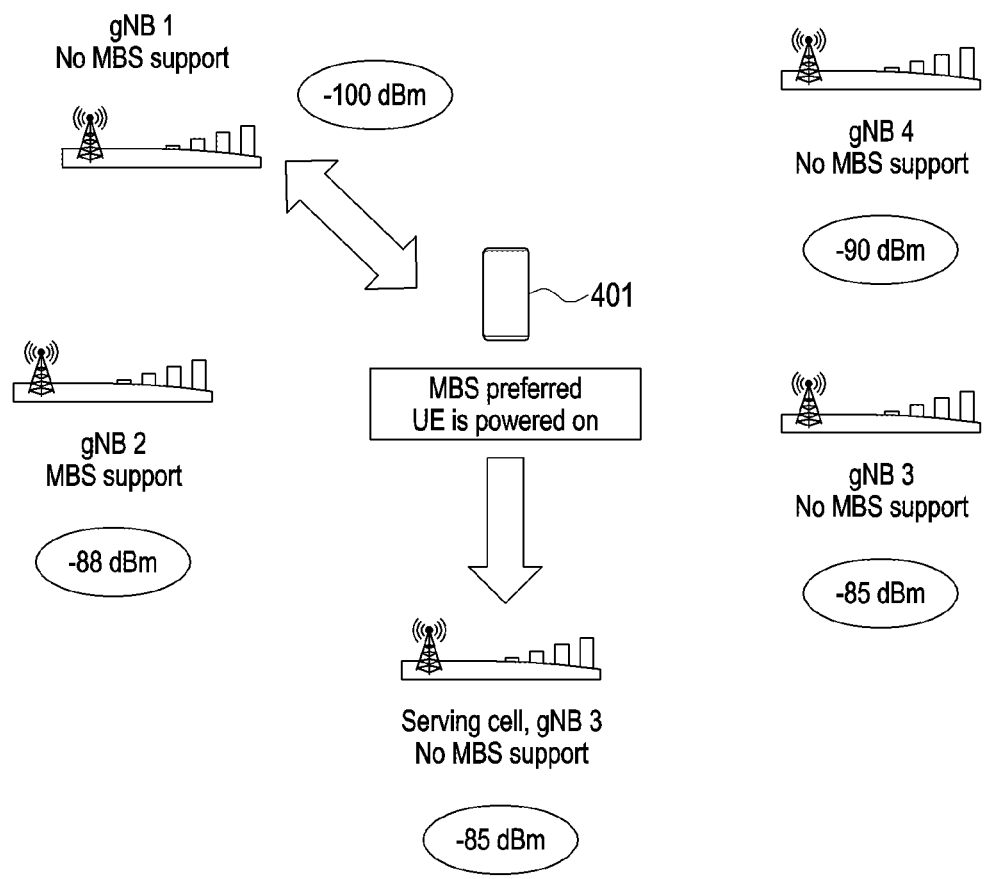
FIG. 4 illustrates a network environment for cell reselection to a cell not supporting MBS, in accordance with existing art.

FIG. 4 illustrates a network environment for cell reselection to a cell not supporting MBS, in accordance with existing art. As known to a person skilled in the art, an MBS preferred UE 401 may perform cell reselection to avoid cell loss in IDLE state. For cell reselection, the UE 401 measures neighbour cells and form a candidate cell list that satisfies the cell reselection criterion. The cell reselection candidate list is sorted based on signal strength. Accordingly, the strongest signal cell is considered for cell reselection when the cell meets the cell reselection criterion. So, the neighbour candidate cell list is formed based on the signal strength, and cell reselection meet criterion. However, the strongest cell for reselection may not necessarily be supporting MBS. It is possible that other candidate cells may be supporting MBS, but they may not be considered for cell reselection. This may lead MBS preferred UE to reselect non-MBS supported cells. For example, as shown in FIG. 4, the UE 401 finds 3 candidate cells—gNb2, gNB3, and gNB4 which meet the cell reselection criterion for cell reselection. Among these, gNB2 supports Release-17 MBS while the other two gNBs (gNB3 and gNB4) do not support MBS. However, in accordance with existing art, the UE 401 reselects a non-MBS supporting cell (e.g., gNB3) based on a signal strength criterion. Although there were other candidate cells available that supported MBS, but the UE 401 reselects a non-MBS supporting cell. As per current behaviour, the UE 401 performs cell re selection based on the signal strength, and no other features support such as MBS support are considered for camping. As a result, the UE 401 discards the chance of availing the MBS impacting the user experience.

Figure 5:
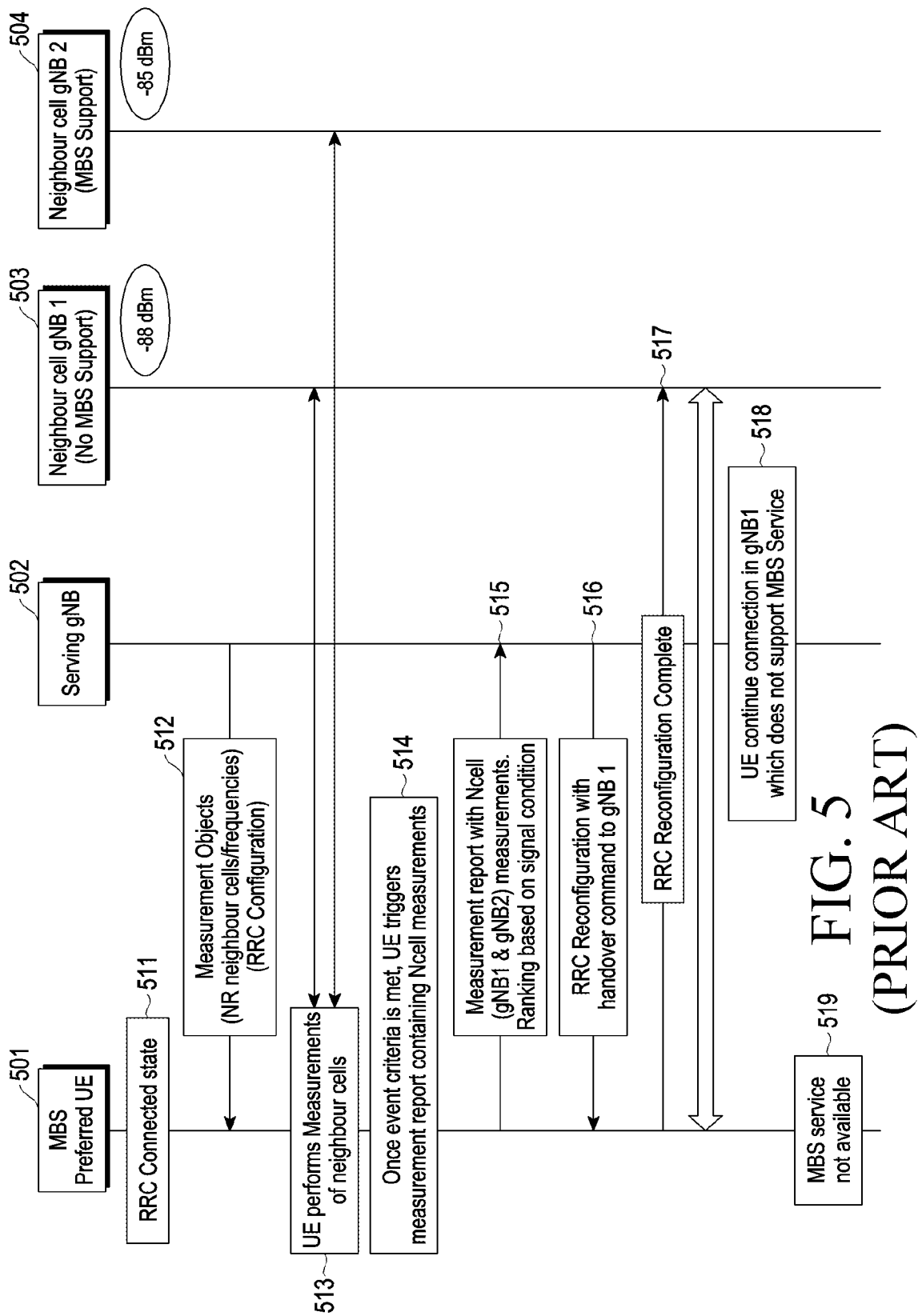
FIG. 5 illustrates a signal flow diagram of performing handover to a cell not supporting MBS, in accordance with existing art.

FIG. 5 illustrates a signal flow diagram of performing handover to a cell not supporting MBS, in accordance with existing art. As known to a person skilled in the art, when the UE 501 is in radio resource control (RRC) connected mode at 511, the MBS preferred UE 501 performs measurement of all configured measurement objects so that the UE 501 can receive handover command from a network for connection continuity. For handover, the serving gNB 502 provides measurement object configuration to the MBS preferred UE 501 in the RRC configuration message at 512. The RRC configuration contains different neighbour cell frequencies which are candidates for handover. The UE 501 performs measurement of the measurement objects to find the neighbour cells to report to the network through measurement reports at 513. The neighbour cell reporting is performed based on signal strength ranking and meeting event criteria for handover. It should be noted that the event criterion may refer to conditions to be satisfied to perform handover in accordance with existing art. If multiple neighbour cells meet the event criterion at 514, then the UE 501 reports the cells based on signal strength based on which network provides the handover command to UE 501 to move to the target cell at 515. As per existing behaviour, the UE 501 receives the handover at 516, without any consideration of MBS support, to a target cell that may not be supporting MBS at 517. For example, as shown in FIG. 5, the UE 501 may select gNB1 503 for handover, which does not support MBS. Hence, for the MBS preferred UE 501, the existing mechanism leads to the non-availability of MBS. Thus, in the existing art, the MBS preferred UE 501 is not handed over to the MBS supporting cell even though such a cell is available at 518 and 519.

Figure 6:
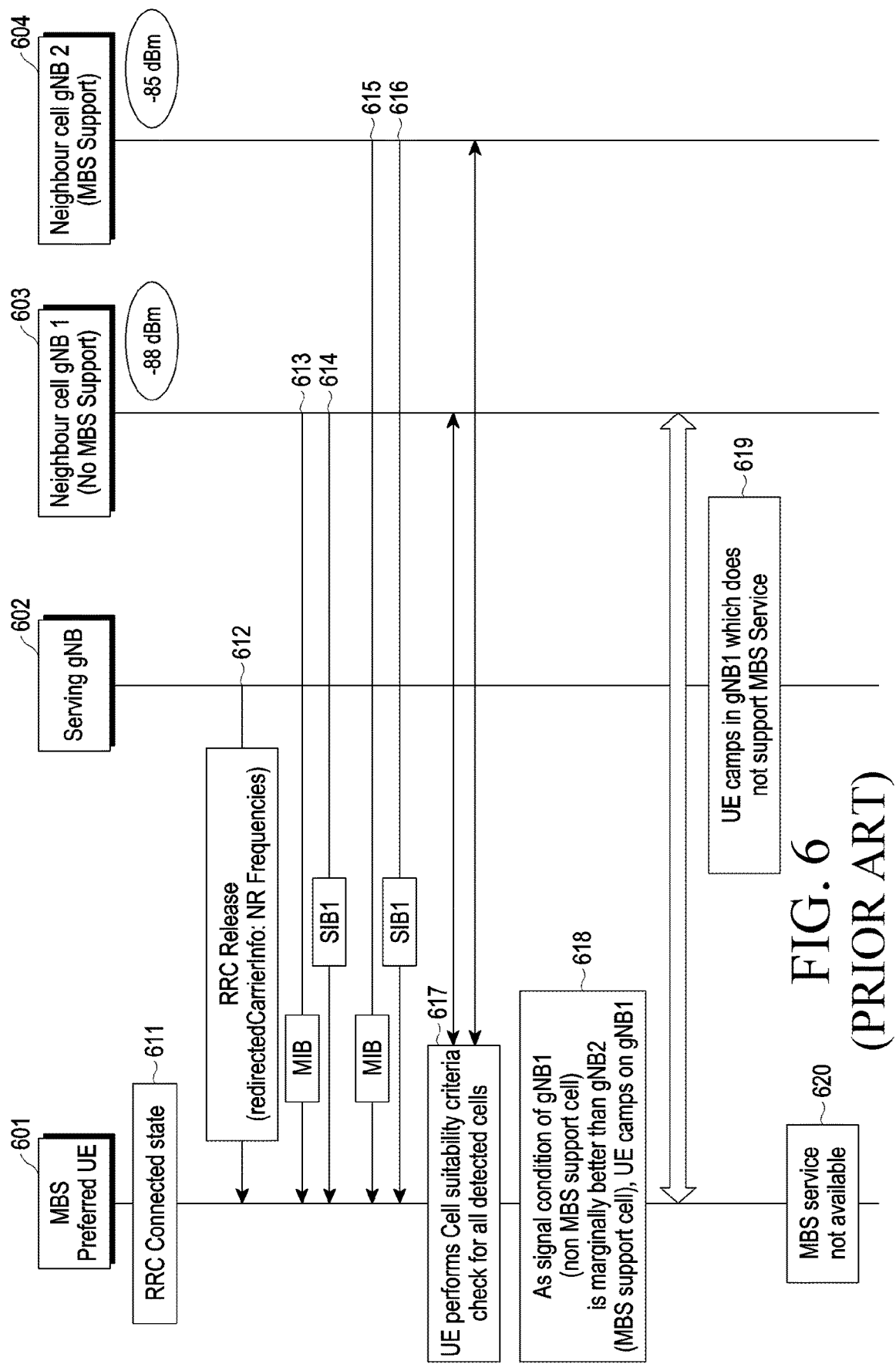
FIG. 6 illustrates a signal flow diagram of performing redirection to a cell not supporting MBS, in accordance with existing art.

FIG. 6 illustrates a signal flow diagram of performing redirection to a cell not supporting MBS, in accordance with existing art. As known to a person skilled in the art, when the UE 601 is in RRC_CONNECTED state at 611, the UE 601 receives RRC release from a serving cell to go to RRC_IDLE state at 612. The UE 601 may receive redirectedCarrierInfo field which contains the NR frequencies list in the RRC release message. So, during redirection, the UE 601 performs a cell search on the provided NR frequencies to detect NR cells and then performs the camping on the suitable cell. The UE 601 performs a cell suitability check and reads mandatory Minimum SIB s (MIB and SIB1) for camping on the cell at 613 to 616. Currently, the UE 601 camps on the detected suitable cell based on S-criterion, and no other checks are being performed by the UE 601 at 617. Even though there can be multiple suitable cells for camping, the UE 601 does not evaluate other cells and camps on the first or the strongest detected cell. As per existing behaviour, as shown in FIG. 6, the MBS preferred UE 601 camps on non-MBS supporting cells (e.g., gNB1) based on the signal strength criterion at 619. Although there were other suitable cells (e.g., gNB2) available that supports MBS, the UE 601 camps on non-MBS supporting cell. So, MBS preferred UE 601 may not get MBS resulting in a poor experience and un-optimized resource utilization at 620. Hence, as per current behaviour, the UE performs camping during redirection based on the signal strength and no other features support such as MBS support are considered for camping.

Figure 7:
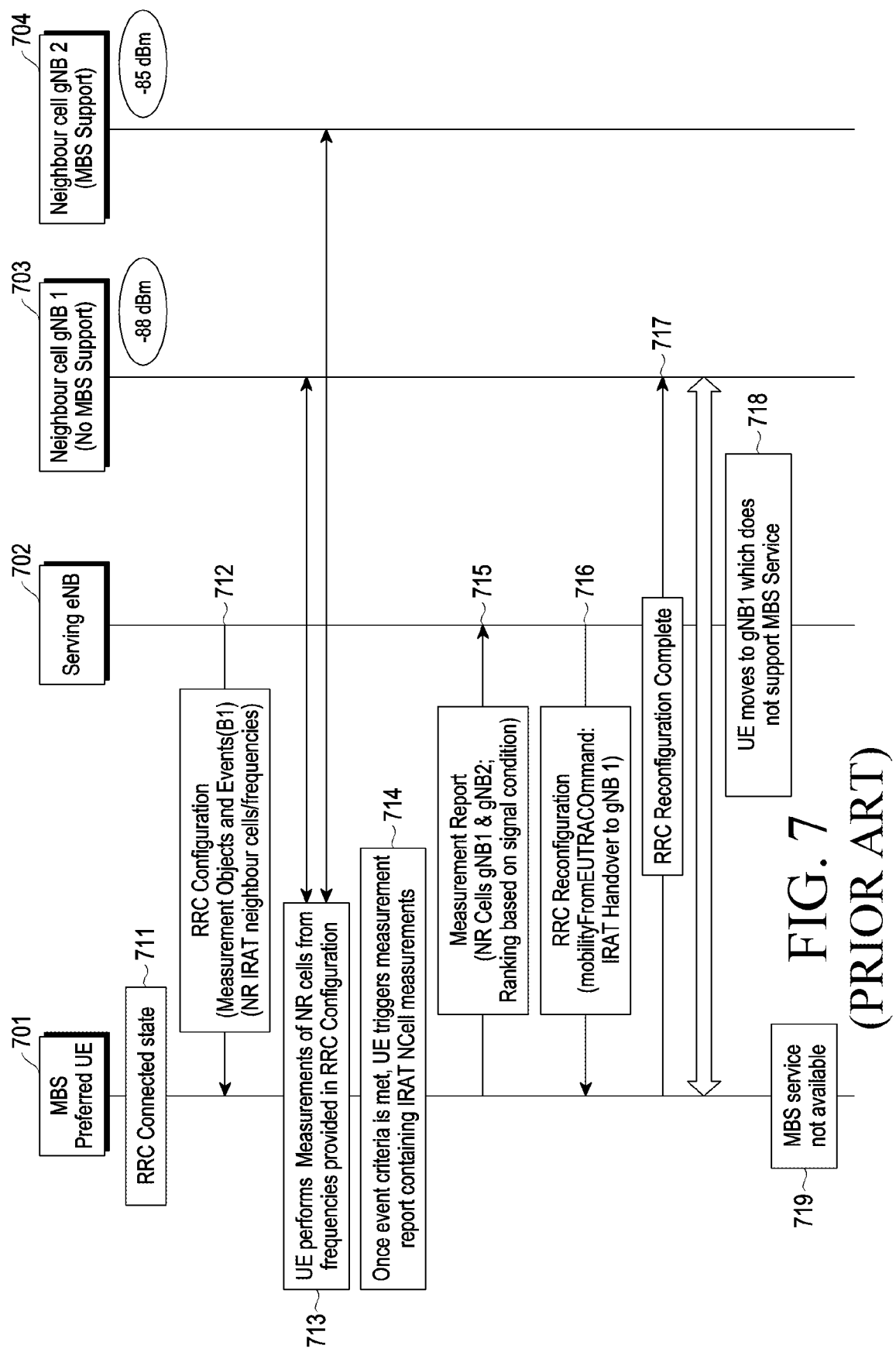
FIG. 7 illustrates a flow diagram of performing IRAT handover to a cell not supporting MBS, in accordance with existing art.

FIG. 7 illustrates a flow diagram of performing IRAT handover to a cell not supporting MBS, in accordance with existing art. As shown in FIG. 7, an MBS preferred UE 701 is in RRC connected state in another non-NR RAT (e.g., LTE) and for IRAT-Handover at 711, the non-NR serving cell (e.g., LTE cell) configures inter-RAT measurement events (event B1) of NR frequencies (measurement objects for NR frequencies) in RRC configuration message at 712. The UE 701 performs the measurements of the configured NR frequency objects to find the neighbour cells to report to the network through a measurement report at 713. The UE 701 sends a B1 measurement report to the serving cell (LTE cell) when the event (event B1) criterion is fulfilled at 715. When UE 701 sends the IRAT measurement report to the network the serving cell (LTE cell) 702 triggers IRAT handover (MobilityFromEUTRACommand) to the target cell (NR Cell) through the RRC configuration message at 716. The NR neighbour cell reporting is performed based on signal strength ranking and meeting the event criterion. It should be noted that the event criterion may refer to conditions to be satisfied to perform IRAT handover in accordance with existing art at 717. If multiple NR neighbour cells meet the event criterion, then the UE 701 reports the cells based on signal strength based on which network provides the handover command to UE to move to the target cell at 718. As per existing behaviour, the MBS preferred UE 701 receives the IRAT handover, without any consideration of support of MBS, to a target cell (e.g., gNB1 703) which may not be supporting the MBS. For the MBS preferred UE 701, the existing mechanism leads to the non-availability of MBS. Thus, the MBS preferred UE 701 may not get MBS even though the MBS is available in the candidate cells (e.g., gNB2 704) at 719.

The present disclosure provides solutions to the above-mentioned problems. In an embodiment, the UE with MBS preferences (devices like audio/video systems in buses/cars/trains or live streaming devices, etc.) may prioritize the MBS supported cells over other cells while performing any one of the cell transition activities such as cell selection or reselection or handover or redirection or IRAT handover. Accordingly, during cell selection/reselection, when a list of suitable cells is available for an MBS preferred UE, the UE may prioritize MBS supported cells over other cells, since this cell is best suited for the MBS preferred UE.

MBS preferred UE may determine the support of MBS in the cell by checking the presence of SIB20/SIB21 (NR mandatory SIB). In an embodiment, the UE may determine the support of MBS in the cell using the si-SchedulingInfor-v1700 present in SIB1 (NR mandatory SIB). In an embodiment, if the system information (SI) scheduling information of a cell contains SIB20 or SIB21, then it indicates that the cell supports MBS. Based on this detection, a UE can prioritize the cell for camping during cell selection or reselection or handover, or redirection.

Further, the MBS preferred UE may perform subsequent cell searches in case of cell loss by prioritizing frequencies present in SIB 21. For example, during handover, when the UE identifies a list of suitable cells for the configured measurement objects, the UE may prioritize reporting of cells that support MB S over other cells. As a result, the network provides a handover command to the preferred cell which supports MBS. This enables the MBS preferred UE to avail MBS.

Similarly, during redirection, when the UE identifies a list of cells for the configured redirected NR frequencies, the UE may prioritize the cells that support MBS over other cells for performing cell camping. This enables the MBS preferred UE to maintain connectivity to the MBS supported NR cells. Similarly, during the IRAT-Handover case, when the MBS preferred UE sends a measurement report for the available NR cells, the UE may prioritize cells that support MBS over other cells. The serving cell evaluates the measurement reports for NR cells sent by the UE and sends Mobility-FromEUTRACommand to a cell that supports MBS. This helps the UE to keep MBS connectivity. Further, if multiple suitable cells with MBS support are available (or) when the UE has to choose a cell from the list of available cells from the frequencies configured in SIB21, then the UE can prioritize the cell further as given below:

When multiple suitable cells with MBS support are available, the UE can prioritize cells further based on relaxed measurement support. This helps UE to save power during any one of the cell transition activities.

If multiple suitable cells are still available with MBS support and relaxed measurement, then the UE can select the cell that has maximum bandwidth to improve data rate and so on.

Example embodiments of the present disclosure will now be described in reference to FIG. 8-FIG. 15.

Figure 8:
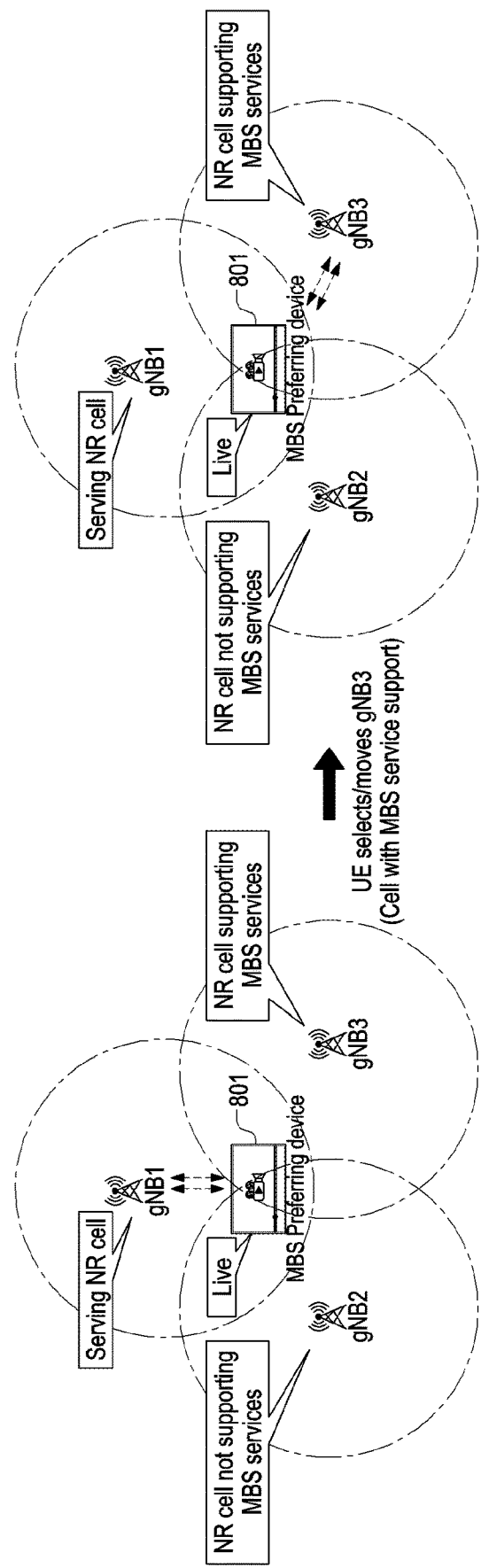
FIG. 8 illustrates a network environment for initiating one of a plurality of cell transition activities for a UE supporting MBS, in accordance with an example embodiment.
Figure 9:
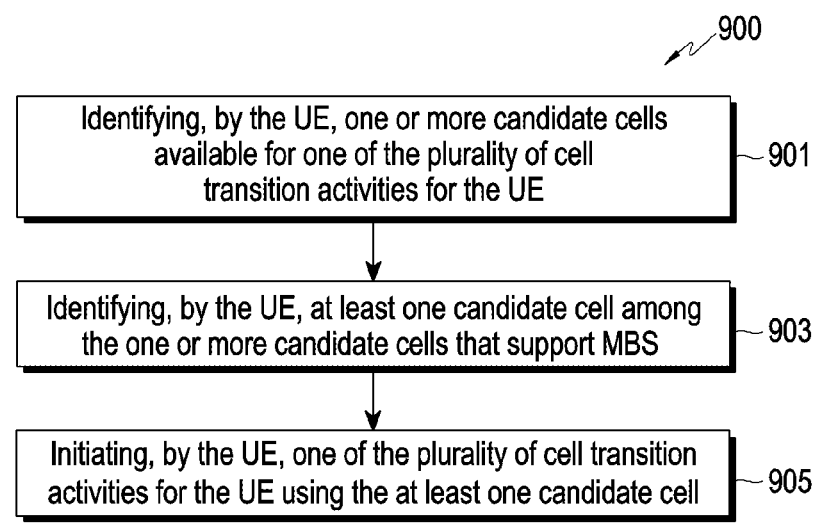
FIG. 9 illustrates a flow diagram depicting a method for initiating one of a plurality of cell transition activities for a UE supporting MBS, in accordance with an example embodiment.

FIG. 8 illustrates a network environment for initiating one of a plurality of cell transition activities for a UE supporting multicast and broadcast services (MBS), in accordance with an example embodiment. FIG. 9 illustrates a flow diagram depicting a method 900 for initiating one of a plurality of cell transition activities for a UE MBS, in accordance with an example embodiment. It should be noted that the method as explained in FIG. 9 may be performed by the UE. In an embodiment, the plurality of cell selection cell transition activities may include cell selection, cell reselection, cell redirection, handover, and Inter-Radio Access Technology (IRAT) handover. It should be noted that any other activity which changes the source/serving cell is a part of cell transition activity.

Referring back to FIG. 9, at operation 901, the method 900 may comprise identifying, by the UE, one or more candidate cells available for one of the plurality of cell transition activities for the UE. For example, in reference to FIG. 8, the UE 801 may identify one or more available candidate cells gNB1, gNB2, and gNB3. In a further embodiment, if one of the plurality of cell transition activities is measurement reporting for one of a handover and an IRAT handover, then the UE may identify one or more candidate cells from a list of neighbour cells provided by a network. This embodiment has been further explained in reference to FIGS. 12A to-12E and 14A to 14E.

Then, at operation 903, the method 900 may comprise identifying, by the UE, at least one candidate cell among the one or more candidate cells that support MBS. In an embodiment, the UE may identify the at least one candidate cell based on a system information (SI) scheduling information of a system information block 20 (SIB20) or a system information block 21 (SIB21) received in a system information block 1 (SIB1) from the one or more candidate cells. In reference to FIG. 8, cell gNB3 may be identified as the at least one candidate cell that supports MBS.

Further, in an embodiment, the UE may determine if the at least one candidate cell satisfies an event criterion associated with one of the plurality of cell transition activities. In an embodiment, the event criterion may be associated with one of the plurality of cell transition activities. For example, if the cell transition activity is cell selection, then, the event criterion may be the event criterion to be satisfied for cell selection in accordance with existing art. Similarly, if the cell transition activity is cell reselection, then the event criterion may be the event criterion to be satisfied for cell reselection in accordance with existing art. Similarly, if the cell transition activity is handover or IRAT handover then, the event criterion may be the event criterion to be satisfied for handover or IRAT handover in accordance with existing art. However, if the UE determines that the identified at least one cell does not satisfy the event criterion, then the UE may identify another candidate cell among the one or more candidate cells that supports MBS.

Referring back to FIG. 9, after identifying the at least one candidate cell that supports MBS, at operation 905, the method 900 may comprise initiating, by the UE, one of the plurality of cell transition activities for the UE using the at least one candidate cell. For example, in reference to FIG. 8, one of the cell transition activities may be initiated using gNB3. Further, in an embodiment, when one of the plurality of cell transition activities is one of a cell selection and a cell redirection, the UE may camp on the at least one candidate cell for initiating the cell selection or the cell redirection for the UE. For example, in reference to FIG. 8, the UE 801 may initiate the cell selection or the cell redirection by camping on gNB3. This embodiment has been further explained in reference to FIGS. 10A to 10E and 13A to 13E.

In a further embodiment, when one of the plurality of cell transition activities is the cell reselection, the UE may reselect to the at least one candidate cell for initiating the cell reselection for the UE. For example, in reference to FIG. 8, the UE 801 may initiate cell reselection by reselecting gNB3. This embodiment has been further explained in reference to FIGS. 11A to 11E.

In a furthermore embodiment, when one of the plurality of cell transition activities is one of the handover and the IRAT handover, the UE may prioritize performing measurements for the at least one candidate cell for initiating the handover and the IRAT handover for the UE. For example, in reference to FIG. 8, the UE 801 may initiate the handover and the IRAT handover by prioritizing performing measurements on gNB3. This embodiment has been further explained in reference to FIGS. 12A to 12E and 14A to 14E.

Figure 10A:
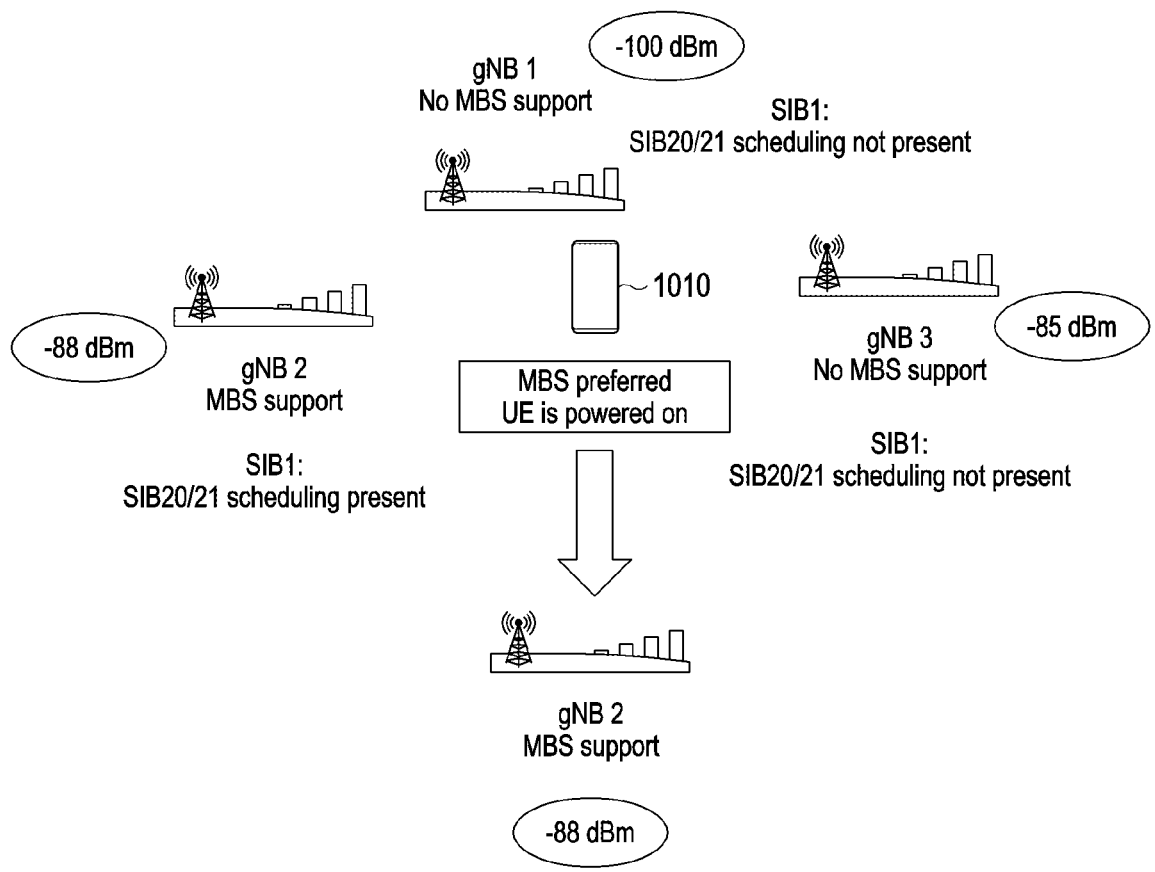
FIG. 10A illustrates a network environment for initiating cell selection for a UE supporting MBS, in accordance with an example embodiment.
Figure 10B:
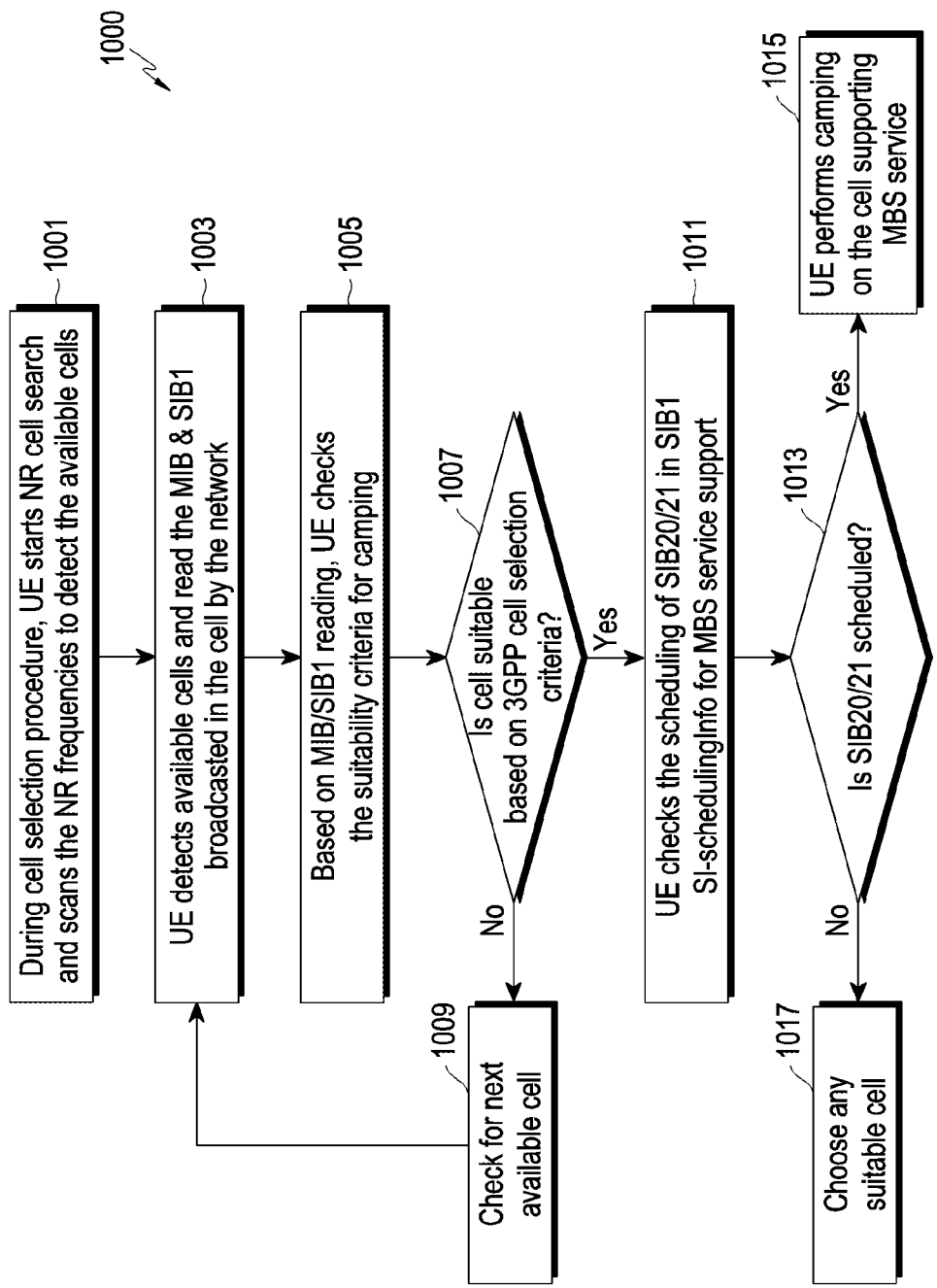
FIG. 10B illustrates a flow chart depicting a method for cell selection for a UE supporting MBS, in accordance with an example embodiment.

FIG. 10A illustrates a network environment for initiating cell selection for the UE supporting MBS, in accordance with an example embodiment. FIG. 10B illustrates a flow chart depicting a method 1000 for cell selection for the UE supporting MBS, in accordance with an example embodiment. For the sake of brevity, FIGS. 10A and 10B will be discussed in conjunction with each other. As known in the art, a master information block (MIB) and SIB1 are the minimum required system information in NR to camp on a cell. SIB1 carries the SI scheduling information of other SIBs present in the cell which is being broadcasted by the network. Hence, with the help of scheduling info in SIB1, the UE comes to know which all SIBs are present in the 5G Cell.

In an example embodiment, during the cell selection procedure, if more than one cell is detected as a suitable cell, then the UE may prioritize the camping on the cell which supports MBS. Based on SIB1 scheduling information contents, the MBS preferred UE may come to know about the support of SIB20/SIB21 which are indicators for MBS support. For example, in reference to FIG. 10A, the UE 1010 may determine that gNB2 supports MBS using SIB1 scheduling information contents and accordingly, may camp on gNB2 which supports MBS for cell selection.

Referring to FIG. 10B, at operation 1001, during the cell selection procedure, the UE starts NR cell search and scans the NR frequencies to detect the available cells. For example, in reference to FIG. 10A, during the cell selection scan, the UE 1010 may find 3 suitable cells—gNB1, gNB2, and gNB3. As can be seen from FIG. 10A, gNB2 supports MBS while other two gNBs (gNB1 and gNB2) do not support MBS. Then, at operation 1003, the UE detects available cells and reads the MIB & SIB1 broadcasted in the cell by the network. Thereafter, at operation 1005, based on MIB/SIB1 reading, the UE checks the suitability criterion for camping. Then, at operation 1007, the UE determines if one of the available cells is suitable based on the 3GPP cell selection criterion. It should be noted that the 3GPP cell selection criterion is known to a person skilled in the art. If the cell does not satisfy the 3GPP cell selection criterion, then at operation 1009, the UE checks for the next available cell. However, if at operation 1007, it is determined that the available cell satisfies the 3GPP cell selection criterion, then at operation 1011, the UE checks whether SIB20/SIB21 is present or not in the cell from SIB1 for example SIB1 of gNB1, gNB2 & gNB3. Accordingly, the UE identifies which cell of all available cells supports MBS. Then, at operation 1013, the UE determines if SIB20/21 is scheduled or not for the cell. If yes, then at operation 1015, the UE performs camping on the cell supporting MBS, for example on cell gNB2. However, if SIB20/21 is not scheduled for the cell then at operation 1017, the UE chooses any suitable cell from the available cells.

So, for camping, the UE prioritizes the cell which supports MBS. Accordingly, in an embodiment, the UE camps on the cell which supports MBS and avail the MBS. Hence, the UE is able to avail MBS whenever possible.

Figure 10C:
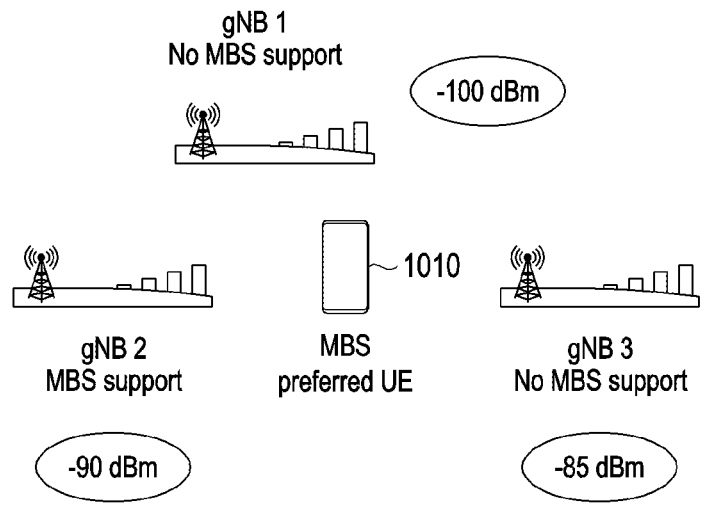
FIGS. 10C, 10D, and 10E illustrate an initial condition of the UE looking for cell selection and cell selection using existing art and examples in the present disclosure respectively, in accordance with an example embodiment.
Figure 10D:
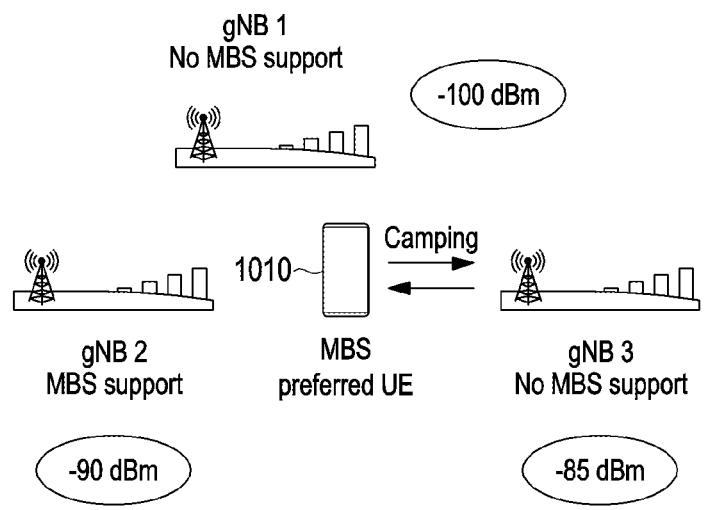
Figure 10E:
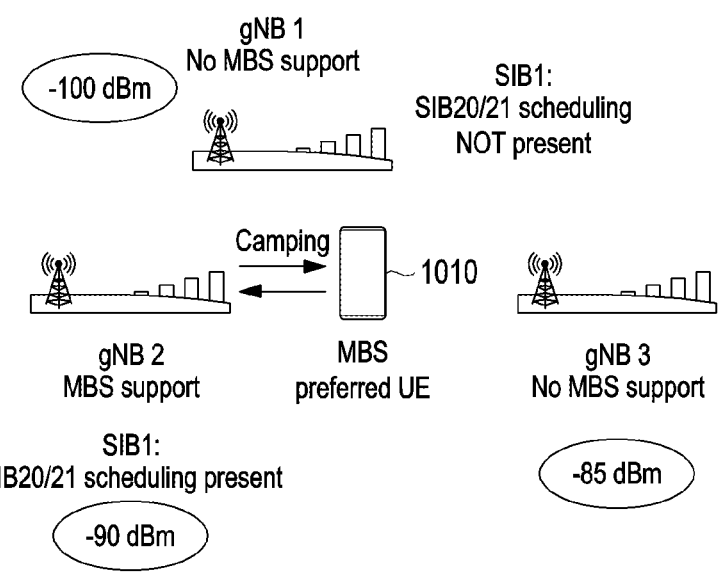

FIGS. 10C-10E illustrates an initial condition of the UE looking for cell selection and cell selection using existing art and examples in the present disclosure respectively, in accordance with an example embodiment. As shown in FIG. 10C, initially the UE 1010 is connected under the following conditions:

TABLE 1

| Cells Detected | Signal Level | Cell selection Criterion? | MBS Support (SIB20/21 in SIB1) |
|---|---|---|---|
| gNB1 | −100 dBm | NA | No |
| gNB2 | −90 dBm | Satisfied | Yes |
| gNB3 | −85 dBm | Satisfied | No |

As shown in FIG. 10D, the UE 1010 initiates cell selection in accordance with existing art, as shown in below table 2:

TABLE 2

| Cells Detected | Signal Level | Camp status | MBS Support (SIB20/21 in SIB1) |
|---|---|---|---|
| gNB1 | −100 dBm | Non-Serving Cell | No |
| gNB2 | −90 dBm | Non-Serving Cell | Yes |
| gNB3 | −85 dBm | Serving Cell | No |

As can be seen from table 2 and FIG. 10D, the UE 1010 camps on the cell based on signal strength, e.g., gNB 3 and MBS availability are not checked.

As shown in FIG. 10E, the UE 1010 initiates cell selection in accordance with an example embodiment, as shown in below table 3:

TABLE 3

| Cells Detected | Signal Level | Camp status | MBS Support (SIB20/21 in SIB1) |
|---|---|---|---|
| gNB1 | −100 dBm | Non-Serving Cell | No |
| gNB2 | −90 dBm | Serving Cell | Yes |
| gNB3 | −85 dBm | Non-Serving Cell | No |

As evident from table 3 and FIG. 10E, in an example embodiment, the UE 1010 checks the presence of SIB20/21 from SIB1 to check the MBS support and camps on the cells which have MBS support, e.g., cell gNB2.

Figure 11A:
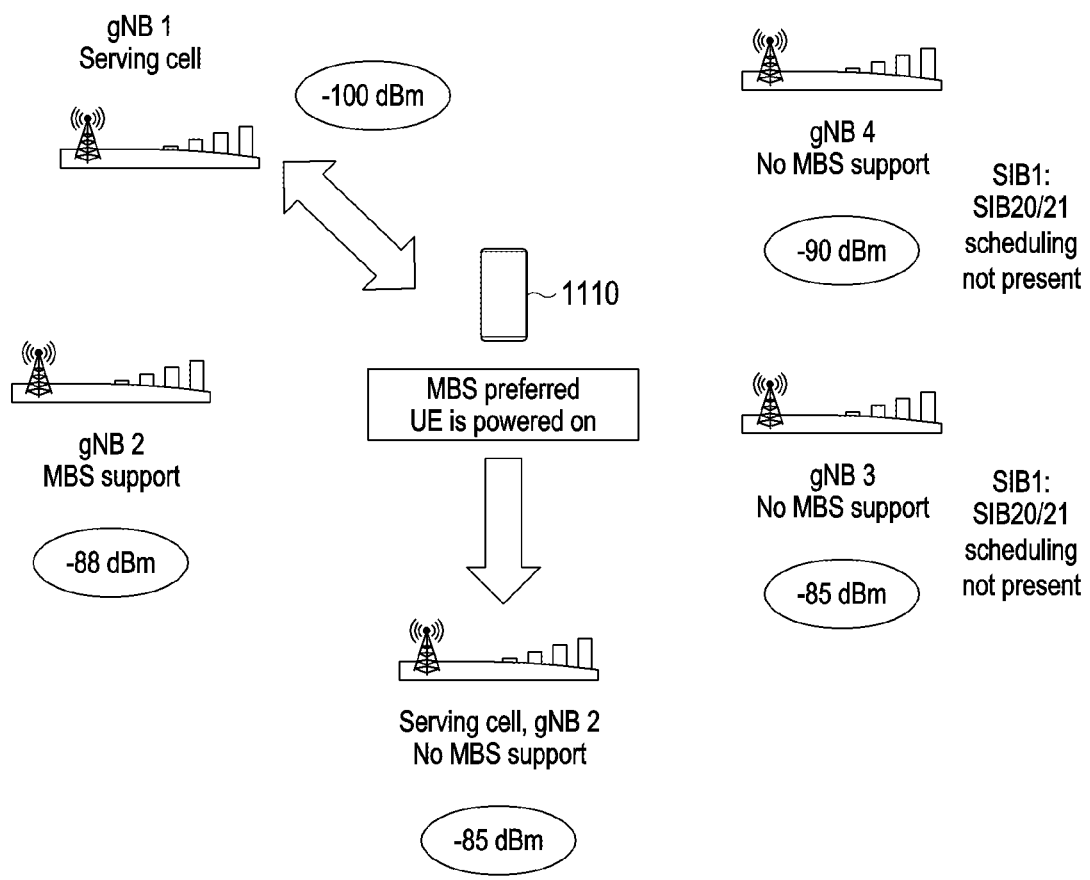
FIG. 11A illustrates a network environment for initiating cell reselection for a UE supporting MBS, in accordance with an example embodiment.
Figure 11B:
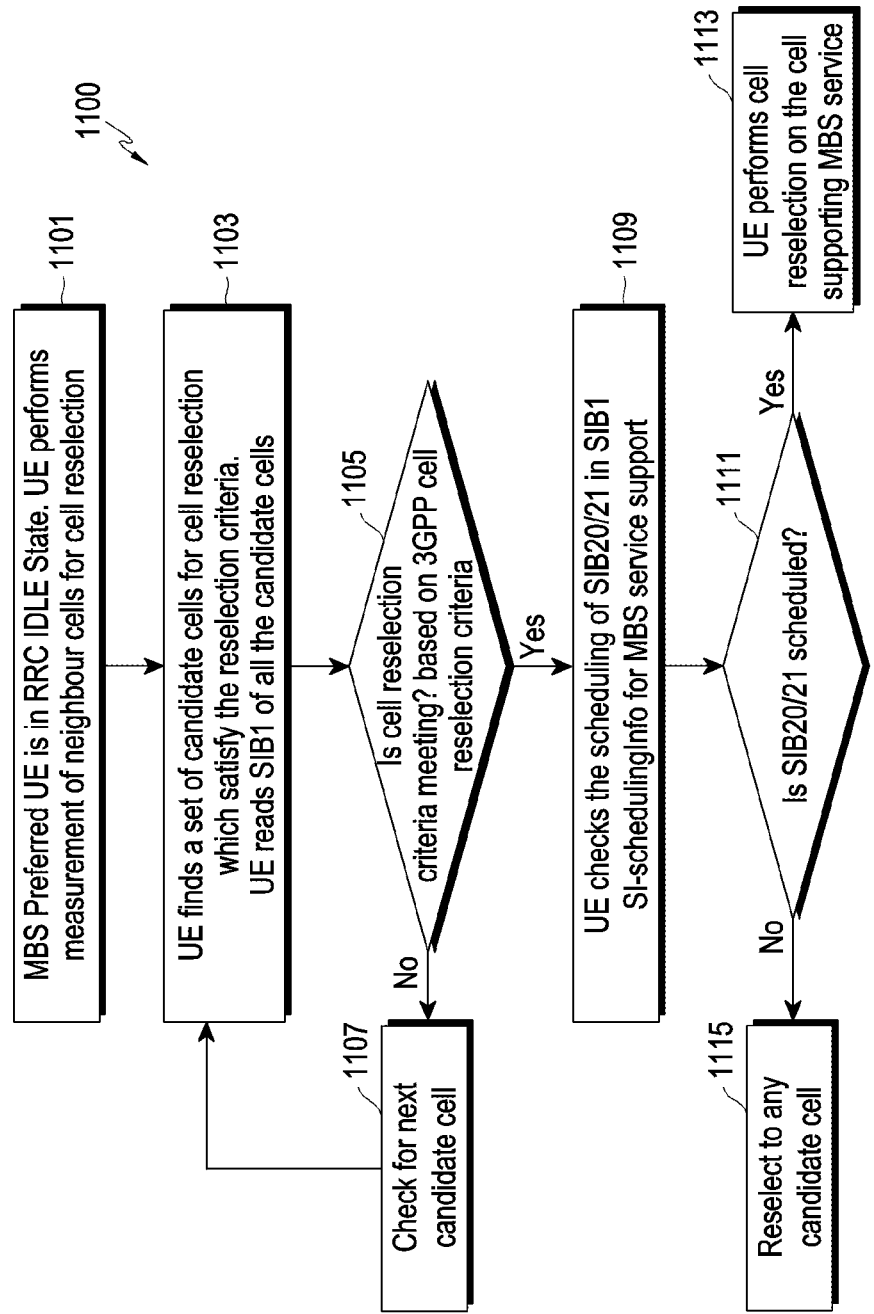
FIG. 11B illustrates a flow chart depicting a method for cell reselection for a UE supporting MBS, in accordance with an example embodiment.

FIG. 11A illustrates a network environment for initiating cell reselection for the UE supporting MBS, in accordance with an example embodiment. FIG. 11B illustrates a flow chart depicting a method 1100 for cell reselection for a UE supporting MBS, in accordance with an example embodiment. For the sake of brevity, FIGS. 11A and 11B will be discussed in conjunction with each other. As known in the art, MIB and SIB1 are the minimum required system information in NR to camp on a cell. SIB1 carries the SI scheduling information of other SIBs present in the cell which is being broadcasted by the network. Accordingly, with the help of scheduling info in SIB1, UE comes to know which all SIBs are present in the 5G Cell.

In an example embodiment, during the cell reselection procedure, if more than one candidate cell meets the cell reselection criterion, then the UE may reselect the cell which supports MBS. The UE may check the scheduling information in each of the cell reselection candidate cells to determine whether SIB20/21 is scheduled or not. Based on SIB1 scheduling information contents, the UE knows about the support of SIB20/SIB21 which is an indicator for MBS support. Hence, in an embodiment, for cell reselection, the UE reselects the cell which supports MBS.

Referring to FIG. 11B, at operation 1101, the UE is in RRC IDLE State. The UE performs measurement of neighbour cells for cell reselection. Then, at operation 1103, the UE finds a set of candidate cells for cell reselection which satisfy the reselection criterion. For example, in reference to FIG. 11A, the UE 1110 is currently connected, directly or indirectly, to gNB1, and the UE may find 3 candidate cells—gNB2, gNB3 and gNB4. As can be seen from FIG. 10A, gNB2 supports MBS while other two gNBs (gNB3 and gNB4) do not support MBS. The UE also reads SIB1 of all the candidate cells, e.g., gNB1, gnB2, and gNB3. Thereafter, at operation 1105, the UE determines if one of the available cells is suitable based on the 3GPP cell reselection criterion. It should be noted that the 3GPP cell reselection criterion is known to a person skilled in the art. If the cell does not satisfy the 3GPP cell reselection criterion, then at operation 1107, the UE checks for the next available cell. However, if at operation 1105, it is determined that the available cell satisfies the 3GPP cell reselection criterion, then at operation 1109, the UE checks whether SIB20/SIB21 is present or not in the cell from SIB1, for example, SIB1 of gNB1, gNB2, and gNB3. Accordingly, the UE identifies which cell(s) of all available cells support MBS. Then at operation 1111, the UE determines if SIB20/21 is scheduled or not for the cell. If yes, then at operation 1113, the UE performs cell reselection on the cell supporting MBS, for example on cell gNB2. However, if SIB20/21 is not scheduled for the cell, then at operation 1115, the UE reselects any candidate cell from the available cells. Hence, in an embodiment, MBS preferred UE checks the scheduling of SIB20/21 using SIB1 of gNB2, gNB3, and gNB4 and identifies in which cell MBS is supported. Based on this, the UE reselects to gNB2 to avail MBS.

Figure 11C:
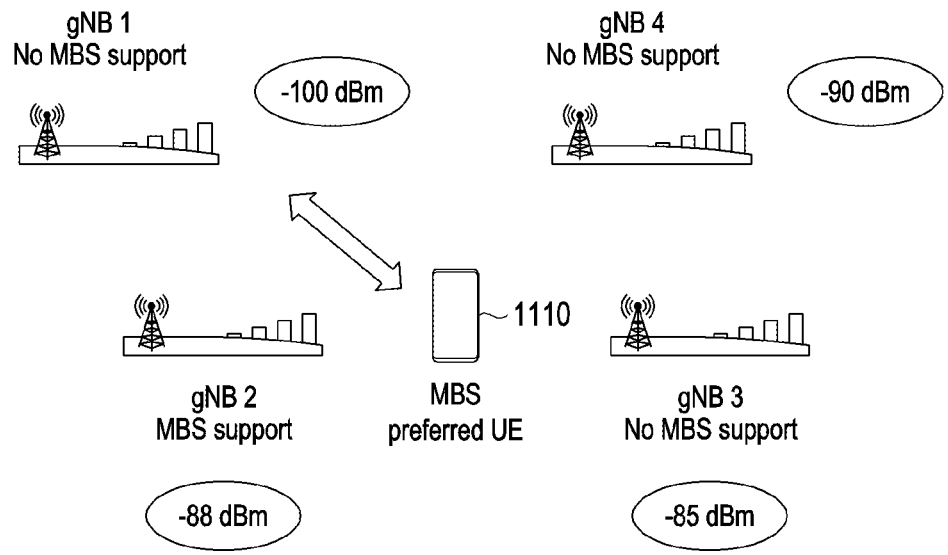
FIGS. 11C, 11D, and 11E illustrate an initial condition of the UE looking for cell reselection and cell reselection using existing art and examples in the present disclosure respectively, in accordance with an example embodiment.
Figure 11D:
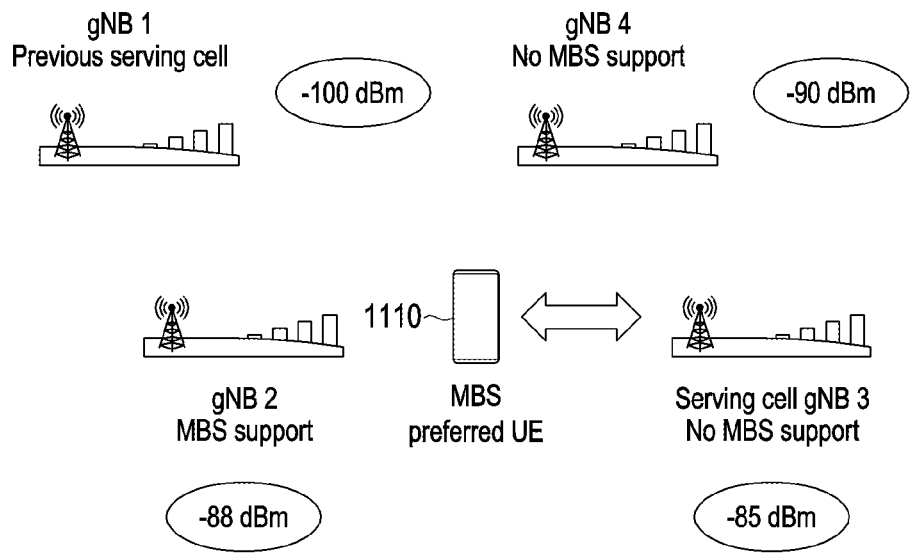
Figure 11E:
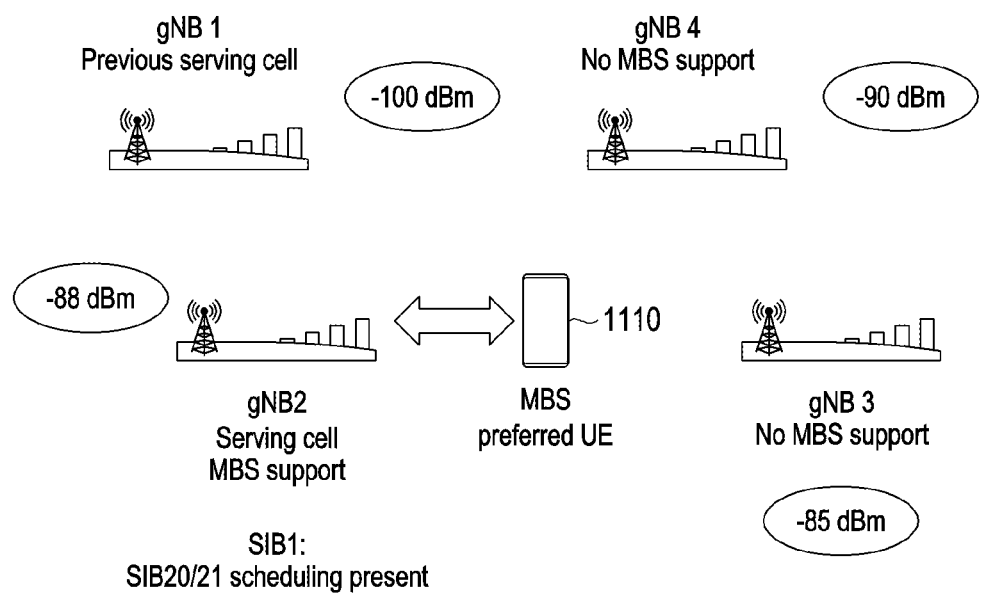

FIGS. 11C to 11E illustrates an initial condition of the UE looking for cell reselection and cell reselection using existing art and examples in the present disclosure respectively, in accordance with an example embodiment. As shown in FIG. 11C, initially the UE 1110 is connected under the following conditions:

TABLE 4

| Candidate cells | Signal Level | Cell reselection Criterion? | MBS Support (SIB20/21 in SIB1) |
|---|---|---|---|
| gNB2 | −88 dBm | Satisfied | Yes |
| gNB3 | −85 dBm | Satisfied | No |
| gNB4 | −90 dBm | Satisfied | No |

As shown in FIG. 11D, the UE 1110 initiates cell reselection in accordance with existing art, as shown in below table 5:

TABLE 5

| Candidate cells | Signal Level | Reselection Status | MBS Support (SIB20/21 in SIB1) |
|---|---|---|---|
| gNB2 | −88 dBm | No Reselection | Yes |
| gNB3 | −85 dBm | Reselected, serving cell | No |
| gNB4 | −90 dBm | No Reselection | No |

As can be seen from table 5 and FIG. 11D, the UE 1110 reselects the cell based on signal strength, e.g., gNB3 and MBS availability is not checked.

As shown in FIG. 11E, the UE 1110 initiates cell reselection in accordance with an example embodiment, as shown in below table 6:

TABLE 6

| Candidate cells | Signal Level | Reselection Status | MBS Support (SIB20/21 in SIB1) |
|---|---|---|---|
| gNB2 | −88 dBm | Reselected, serving cell | Yes |
| gNB3 | −85 dBm | No Reselection | No |
| gNB4 | −90 dBm | No Reselection | No |

As evident from table 5 and FIG. 11E, in an example embodiment, the UE 1110 checks the presence of SIB20/21 from SIB1 to check the MBS support and reselects the cell which has MBS support, e.g., cell gNB2.

Each embodiment herein may be used in combination with any other embodiment(s) described herein.

Figure 12A:
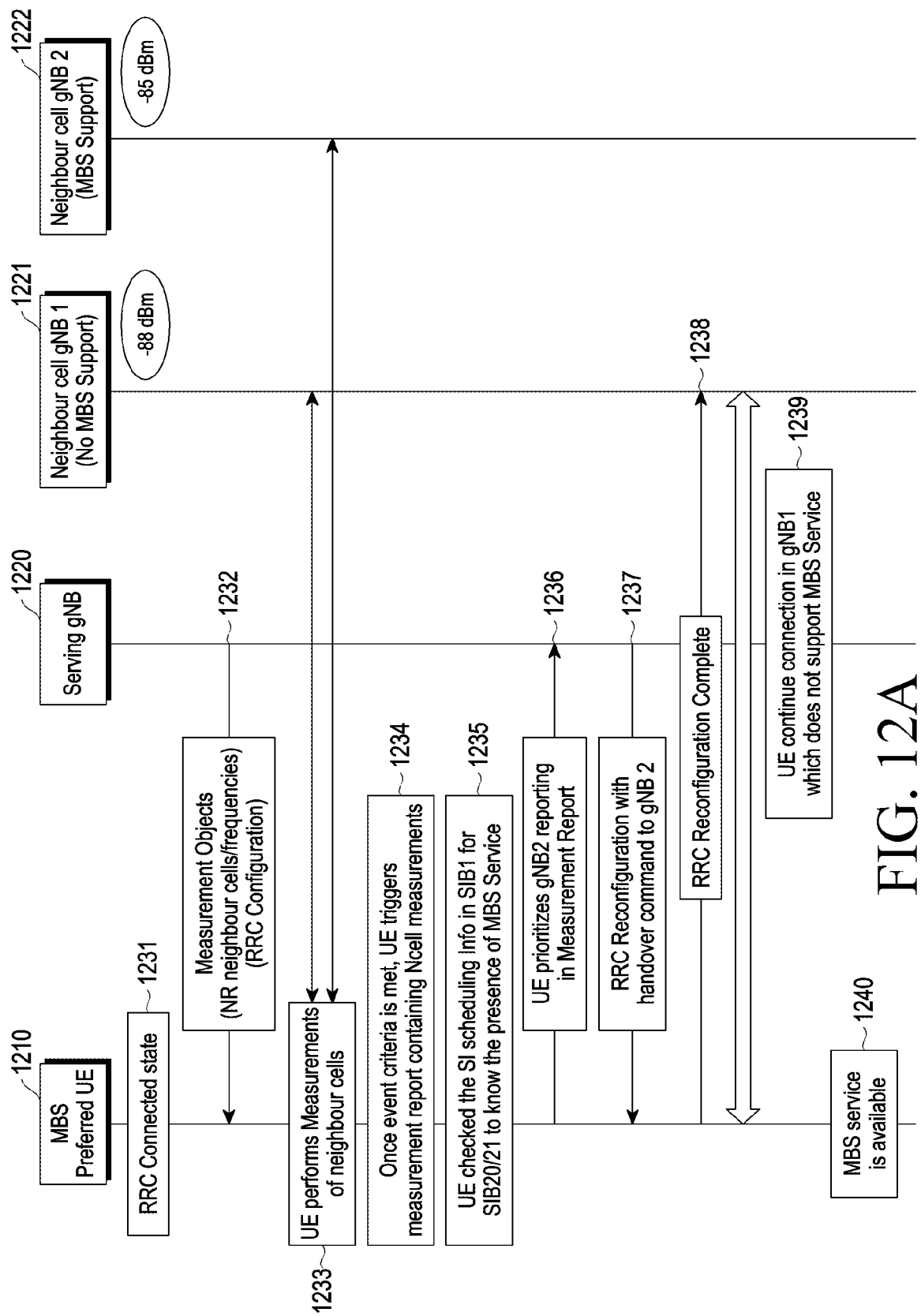
FIG. 12A illustrates a signal flow diagram for initiating cell handover for a UE supporting MBS, in accordance with an example embodiment.
Figure 12B:
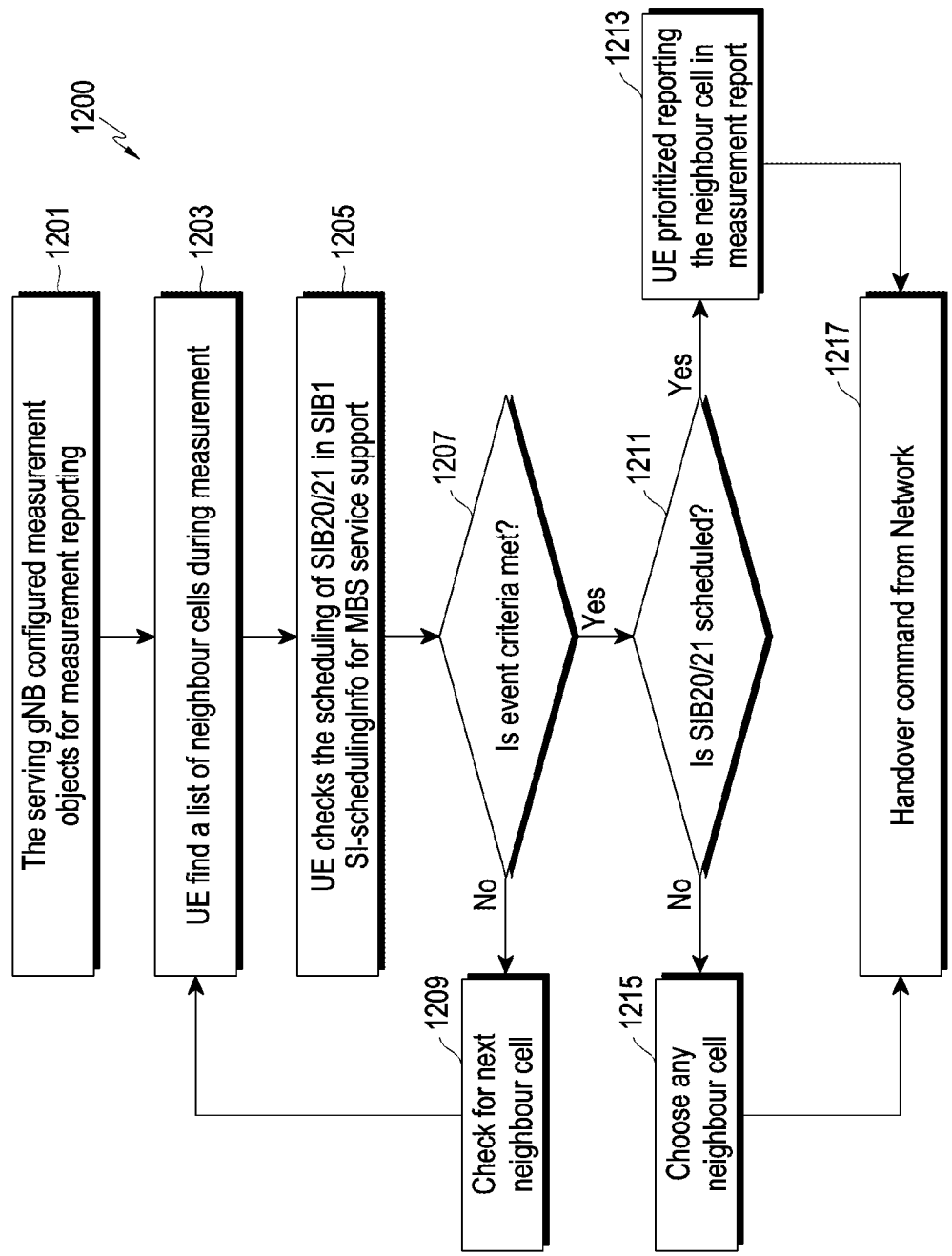
FIG. 12B illustrates a flow chart depicting a method for cell handover for a UE supporting MBS, in accordance with an example embodiment.

FIG. 12A illustrates a signal flow diagram for initiating cell handover for a UE supporting MBS, in accordance with an example embodiment. FIG. 12B illustrates a flow chart depicting a method 1200 for cell handover for the UE supporting MBS, in accordance with an example embodiment. For the sake of brevity, FIGS. 12A and 12B will be discussed in conjunction with each other. As known in the art, MIB and SIB1 are the minimum required system information in NR to camp on a cell. SIB1 carries the SI scheduling information of other SIBs present in the cell which is being broadcasted by the network. When the UE is configured with measurement objects in connected mode, then UE performs measurement of these objects to report to the network for handover.

In an example embodiment, as shown in FIG. 12A, when the UE 1210 is in radio resource control (RRC) connected mode at 1231, the MBS preferred UE 1210 performs measurement of all configured measurement objects so that the UE 1210 can receive handover command from a network for connection continuity. For handover, the serving gNB 1220 provides measurement object configuration to the MBS preferred UE 1210 in the RRC configuration message at 1232. The RRC configuration contains different neighbour cell frequencies which are candidates for handover. The UE 1210 performs measurement of the measurement objects to find the neighbour cells to report to the network through measurement reports at 1233. The neighbour cell reporting is performed based on signal strength ranking and meeting event criteria for handover. It should be noted that the event criterion may refer to conditions to be satisfied to perform handover in accordance with existing art. If multiple neighbour cells meet the event criterion at 1234, for all the detected neighbour cells, the UE 1210 determines whether MBS support is available or not by checking the SI scheduling information in SIB1 for SIB20/21 at 1235. Based on SIB1 scheduling information contents, the UE 1210 knows about the presence of SIB20/SIB21 which is an indicator for MBS support. Further, when the UE 1210 identifies a list of neighbour cells meeting the event criterion for handover, the UE 1210 prioritizes reporting the cells that support MBS over other cells in the measurement report at 1236. It should be noted that the event criterion for handover is in accordance with the 3GPP standard and is known to a person skilled in the art. Thus, the UE 1210 uses both measured signal strength and MBS support of the cell for sending measurement reports. Then, the network provides a handover command to MBS supported cell at 1237 to 1239. This enables the UE 1210 to avail MBS at 1240. Further, if MBS supporting cells are not found, then UE performs its normal behaviour and sends measurement reports as per signal strength. The UE behaviour does not get impacted in this case.

Referring to FIG. 12B, at operation 1201, the serving gNB configures measurement objects for measurement reporting. Then, at operation 1203, the UE finds a list of neighbour cells during measurement, e.g., gNB1 and gNB2. As shown in FIG. 12A, gNB2 1222 supports MBS while gNB1 does not support MBS. Thereafter, at operation 1205, the UE checks the scheduling of SIB20/21 in SIB1 SI-schedulingInfo for MBS support. Then at operation 1207, the UE determines if the event criterion for the handover is met or not. If no, then at operation 1209, the UE checks for the next neighbour cell. If yes, then at operation 1211, the UE checks whether SIB20/SIB21 is present or not for the cell. If yes, then at operation 1213, the UE prioritizes reporting the neighbour cell in the measurement report. However, if SIB20/21 is not scheduled for the cell, then at operation 1215, the UE chooses any neighbour cell from the available cells. Then at operation 1217, the UE receives a handover command from the network for the cell chosen either at operation 1213 or 1215.

Figure 12C:
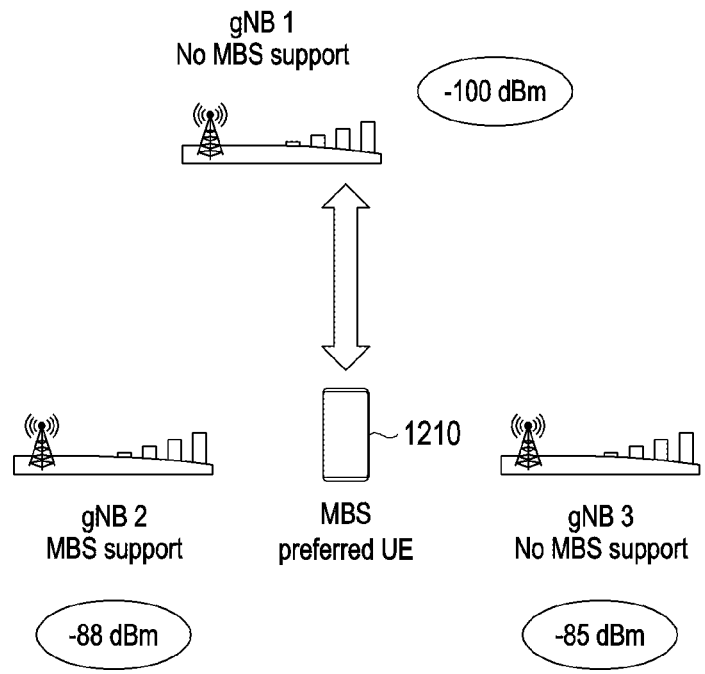
FIGS. 12C, 12D, and 12E illustrate an initial condition of the UE looking for cell handover and cell handover using existing art and examples in the present disclosure respectively, in accordance with an example embodiment.
Figure 12D:
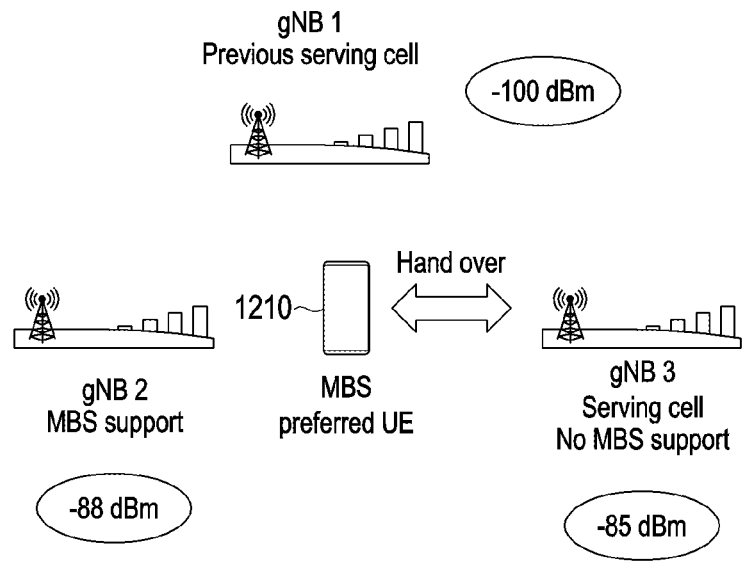
Figure 12E:
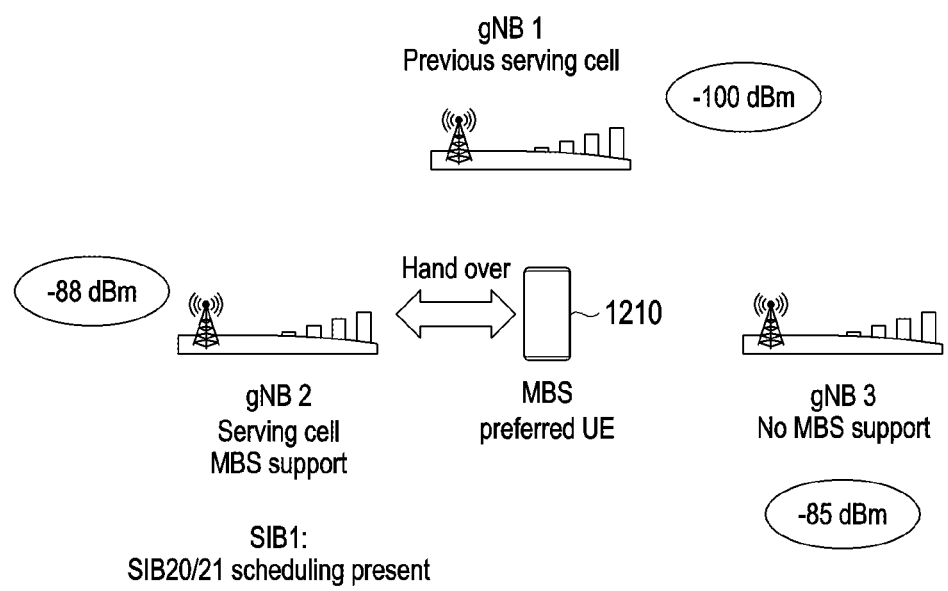

FIGS. 12C to 12E illustrates an initial condition of the UE looking for cell handover and cell handover using existing art and examples in the present disclosure respectively, in accordance with an example embodiment. As shown in FIG. 12C, initially the UE 1210 is connected, directly or indirectly, under the following conditions:

TABLE 7

| Neighbor Cells | Signal Level | Event criterion | MBS Support (SIB20/21 in SIB1) |
|---|---|---|---|
| gNB2 | −90 dBm | Satisfied | Yes |
| gNB3 | −85 dBm | Satisfied | No |

As shown in FIG. 12D, the UE 1210 initiates cell handover in accordance with existing art, as shown in below table 8:

TABLE 8

| Neighbor Cells | Signal Level | Handover Target Cell | MBS Support (SIB20/21 in SIB1) |
|---|---|---|---|
| gNB2 | −90 dBm | Non-Serving Cell | Yes |
| gNB3 | −85 dBm | Handover Command, Serving Cell | No |

As can be seen from table 8 and FIG. 12D, the UE 1210 camps on the cell based on signal strength, e.g., gNB3 and MBS availability is not checked.

As shown in FIG. 12E, the UE 1210 initiates cell handover in accordance with an example embodiment, as shown in below table 9:

TABLE 9

| Neighbour Cells | Signal Level | Handover Target Cell | MBS Support (SIB20/21 in SIB1) |
|---|---|---|---|
| gNB2 | −90 dBm | Handover Command Serving Cell | Yes |
| gNB3 | −85 dBm | Non-Serving Cell | No |

As evident from table 9 and FIG. 12E, in an example embodiment, the UE 1210 checks the presence of SIB20/21 from SIB1 to check the MBS support and camps on the cells which have MBS support, e.g., cell gNB2.

Figure 13A:
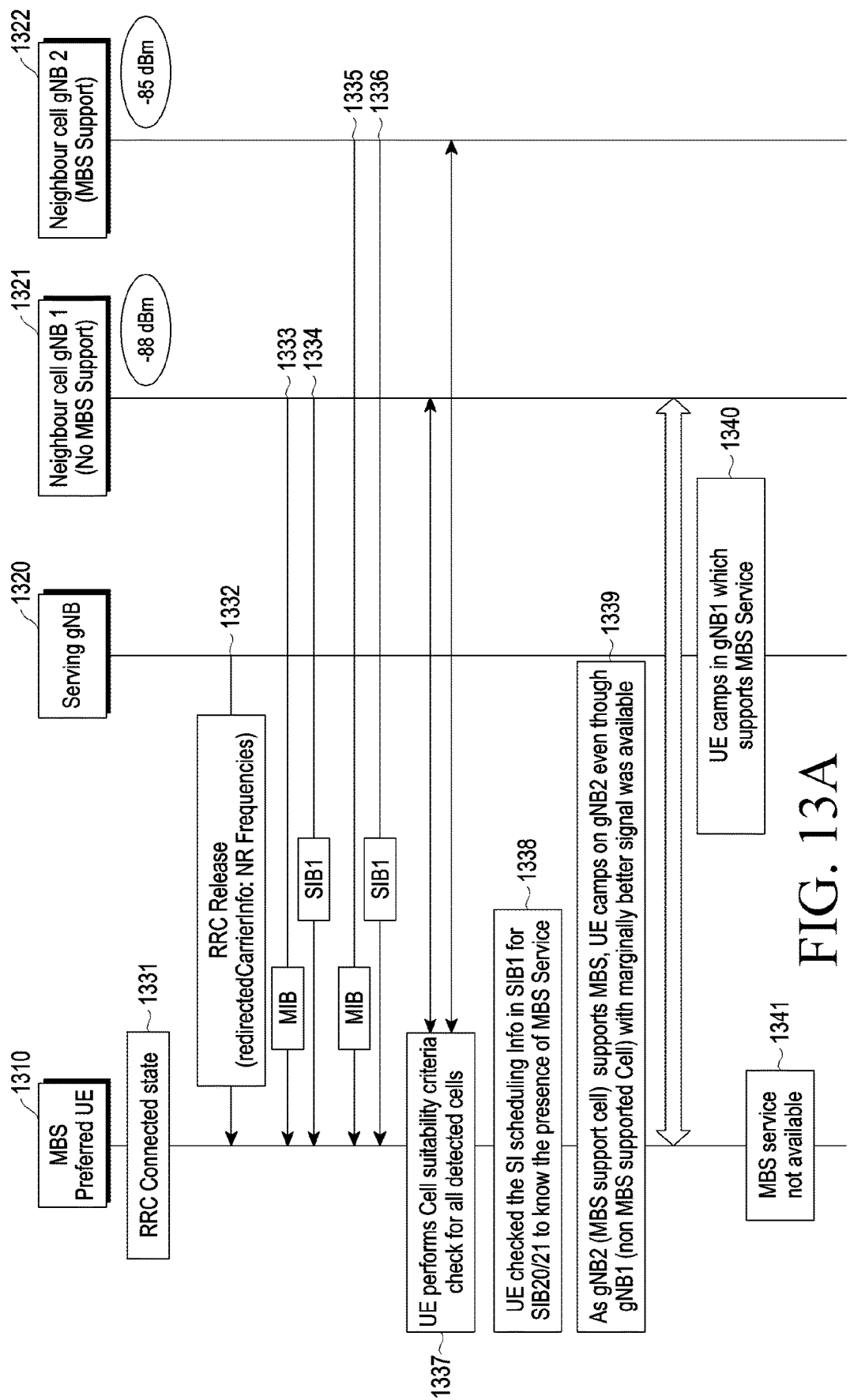
FIG. 13A illustrates a signal flow diagram for initiating cell redirection for a UE supporting MBS, in accordance with an example embodiment.
Figure 13B:
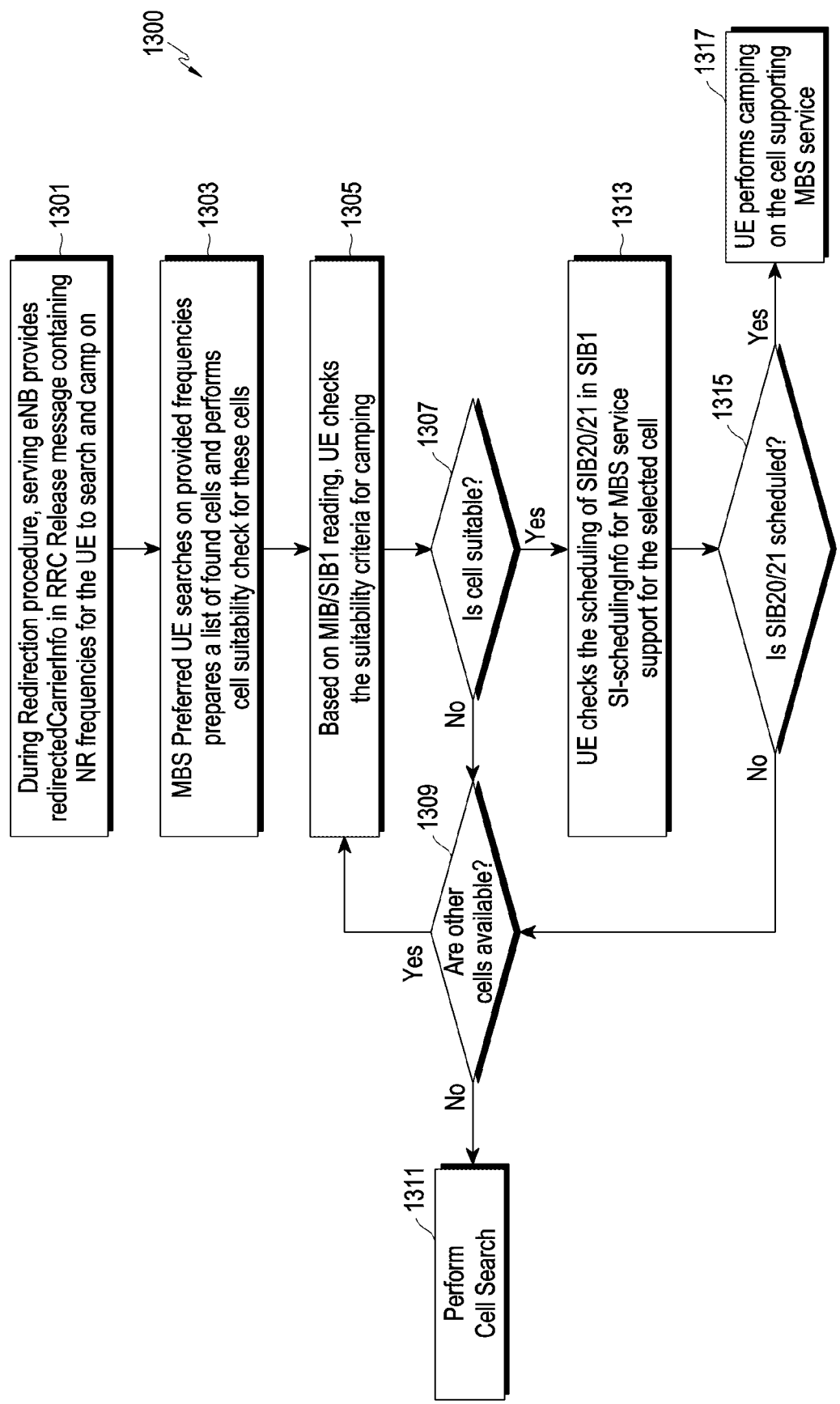
FIG. 13B illustrates a flow chart depicting a method for cell redirection for a UE supporting MBS, in accordance with an example embodiment.

FIG. 13A illustrates a signal flow diagram for initiating cell redirection for the UE supporting MBS, in accordance with an example embodiment. FIG. 13B illustrates a flow chart depicting a method 1300 for cell redirection for a UE supporting MBS, in accordance with an example embodiment. For the sake of brevity, FIGS. 13A and 13B will be discussed in conjunction with each other. As shown in FIG. 13A, during the redirection scenario, gNB provides NR frequencies in the redirectedCarrierInfo in the RRC Connection Release message when the UE goes from RRC_CONNECTED state to RRC_IDLE state.

In an example embodiment, when the UE scans the target frequencies (received in RRC Release), and for all the detected NR cells, the UE determines whether MBS support is available by checking the SI scheduling information in SIB1 for SIB20/21. Further as shown in FIG. 13A, when the UE 1310 is in RRC_CONNECTED state at 1331, the UE 1310 receives RRC release from a serving cell to go to RRC_IDLE state at 1332. The UE 1310 may receive redirectedCarrierInfo field which contains the NR frequencies list in the RRC release message. So, during redirection, the UE 1310 performs a cell search on the provided NR frequencies to detect NR cells and then performs the camping on the suitable cell. The UE 1310 performs a cell suitability check and reads mandatory Minimum SIBs (MIB and SIB1) for camping on the cell at 1333 to 1336. Currently, the UE 1310 camps on the detected suitable cell based on S-criterion, and no other checks are being performed by the UE 1310 at 1337. The UE 1310 checks the SI scheduling information in the SIB1 for SIB 20/21 to know the presence of MBS service at 1338. When the UE 1310 identifies a list of cells for the configured NR frequencies, gNB1 1321 and gNB2 1322, the UE 1310 prioritizes the cell that supports MBS, e.g., gNB2 1322 over the other cell, e.g., gNB1 1321, for camping at 1339. Hence, the UE 1310 is able to avail the MBS in the camped cell at 1340.

Referring to FIG. 13B, at operation 1301, during the Redirection procedure, the serving eNB provides redirectedCarrierInfo in RRC Release message containing NR frequencies for the UE to search and camp on. Then, at operation 1303, the UE searches on provided frequencies and prepares a list of found cells, and performs a cell suitability check for these cells, e.g., gNB1 and gNB2. As shown in FIG. 13A, gNB2 1322 supports MBS while gNB1 1321 does not support MBS. Thereafter, at operation 1305, based on MIB/SIB1 reading, the UE checks the suitability criterion for camping. It should be noted that the suitability criterion for camping for cell redirection is in accordance with 3GPP standards and is known to a person skilled in the art. Then at operation 1307, the UE determines if the cell is suitable as per the 3GPP standard. If no, then at operation 1309, the UE checks if any other cell is available. If no, then at operation 1311, the UE performs a cell search. However, if at operation 1307, the UE determines if the cell is suitable as per the 3GPP standard, then the method moves to operation 1313. At operation 1313, the UE checks the scheduling of SIB20/21 in SIB1 SI-schedulingInfo for MBS support for the selected cell. Then at operation 1315, the UE checks whether SIB20/SIB21 is present or not for the cell. If yes, then at operation 1317, the UE performs camping on the cell supporting MBS. However, if SIB20/21 is not scheduled for the cell, then the method moves back to operation 1309.

Figure 13C:
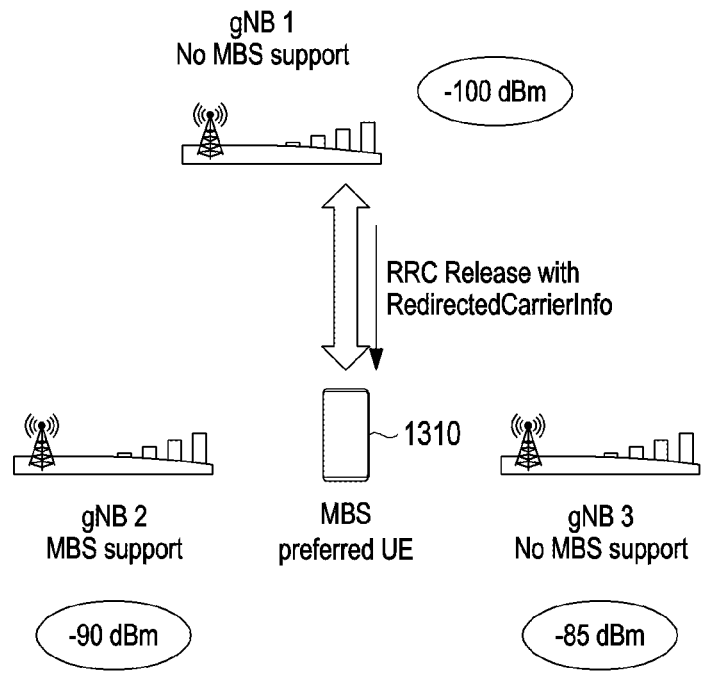
FIGS. 13C, 13D, and 13E illustrate an initial condition of the UE looking for cell redirection and cell redirection using existing art and examples in the present disclosure respectively, in accordance with an example embodiment.
Figure 13D:
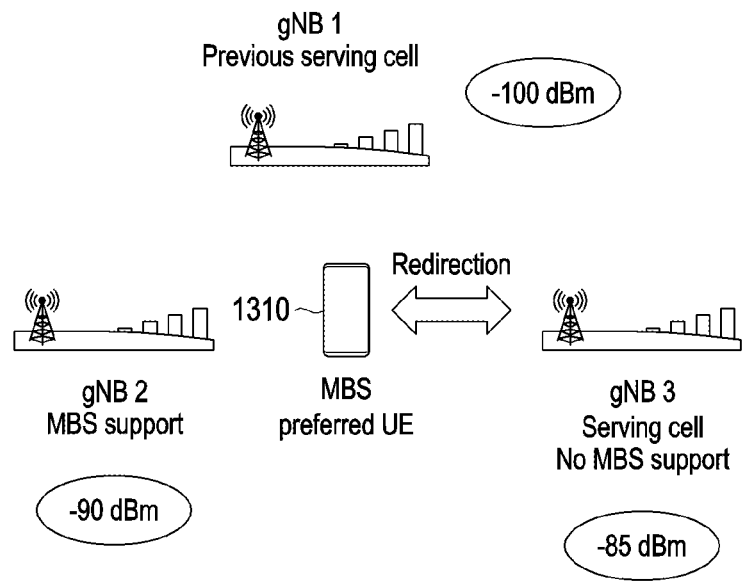
Figure 13E:
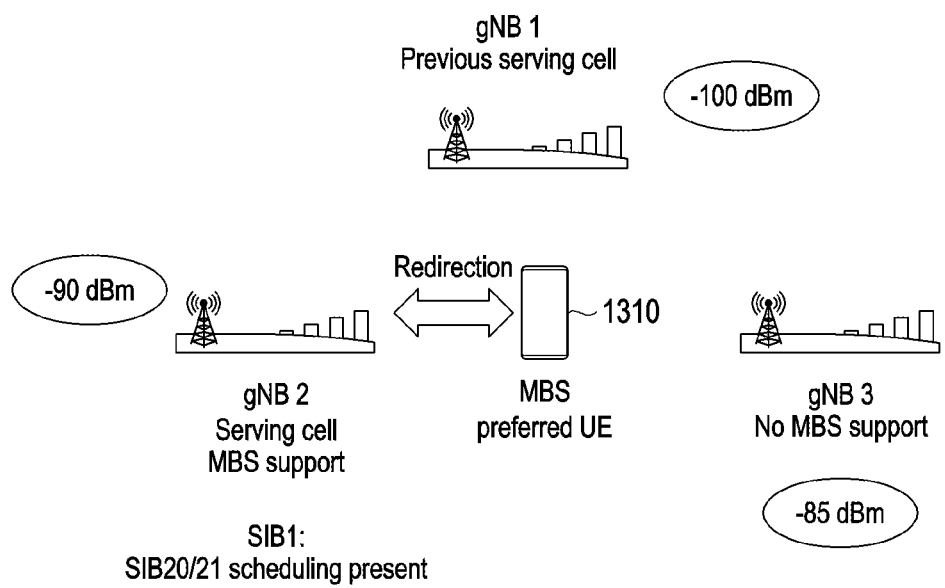

FIGS. 13C to 13E illustrates an initial condition of the UE looking for cell redirection and cell redirection using existing art and examples in the present disclosure respectively, in accordance with an example embodiment. As shown in FIG. 13C, initially the UE 1310 is connected under the following conditions:

TABLE 10

| Neighbor Cells | Signal Level | Cell Suitability | MBS Support (SIB20/21 in SIB1) |
|---|---|---|---|
| gNB2 | −90 dBm | Satisfied | Yes |
| gNB3 | −85 dBm | Satisfied | No |

As shown in FIG. 13D, the UE 1310 initiates cell redirection in accordance with existing art, as shown in below table 11:

TABLE 11

| Neighbour Cells | Signal Level | Camp Status | MBS Support (SIB20/21 in SIB1) |
|---|---|---|---|
| gNB2 | −90 dBm | Non-Serving Cell | Yes |
| gNB3 | −85 dBm | Camped, Serving Cell | No |

As can be seen from table 11 and FIG. 13D, the UE 1310 camps on the cell based on signal strength, e.g., gNB3 and MBS availability is not checked.

As shown in FIG. 13E, the UE 1310 initiates cell redirection in accordance with an example embodiment, as shown in below table 12:

TABLE 12

| Neighbour Cells | Signal Level | Cell Suitability | MBS Support (SIB20/21 in SIB1) |
|---|---|---|---|
| gNB2 | −90 dBm | Camped, Serving Cell | Yes |

TABLE 12-continued

| Neighbour Cells | Signal Level | Cell Suitability | MBS Support (SIB20/21 in SIB1) |
|---|---|---|---|
| gNB3 | −85 dBm | Non-Serving Cell | No |

As evident from table 12 and FIG. 13E, in an example embodiment, the UE 1310 checks the presence of SIB20/21 from SIB1 SI to check the MBS support and camps on the cells which have MBS support, e.g., cell gNB2.

Figure 14A:
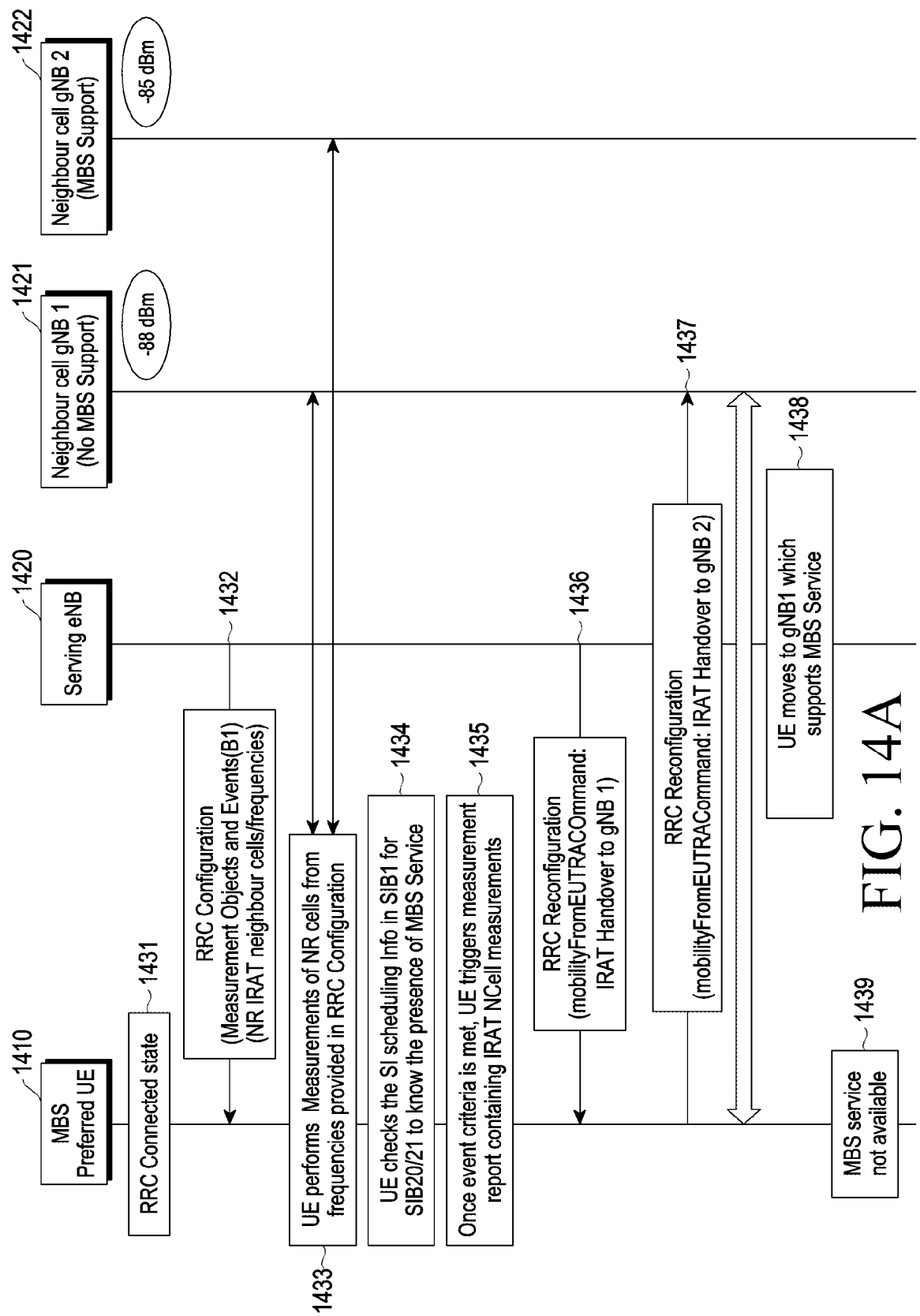
FIG. 14A illustrates a signal flow diagram for initiating cell IRAT handover for a UE supporting MBS, in accordance with an example embodiment.
Figure 14B:
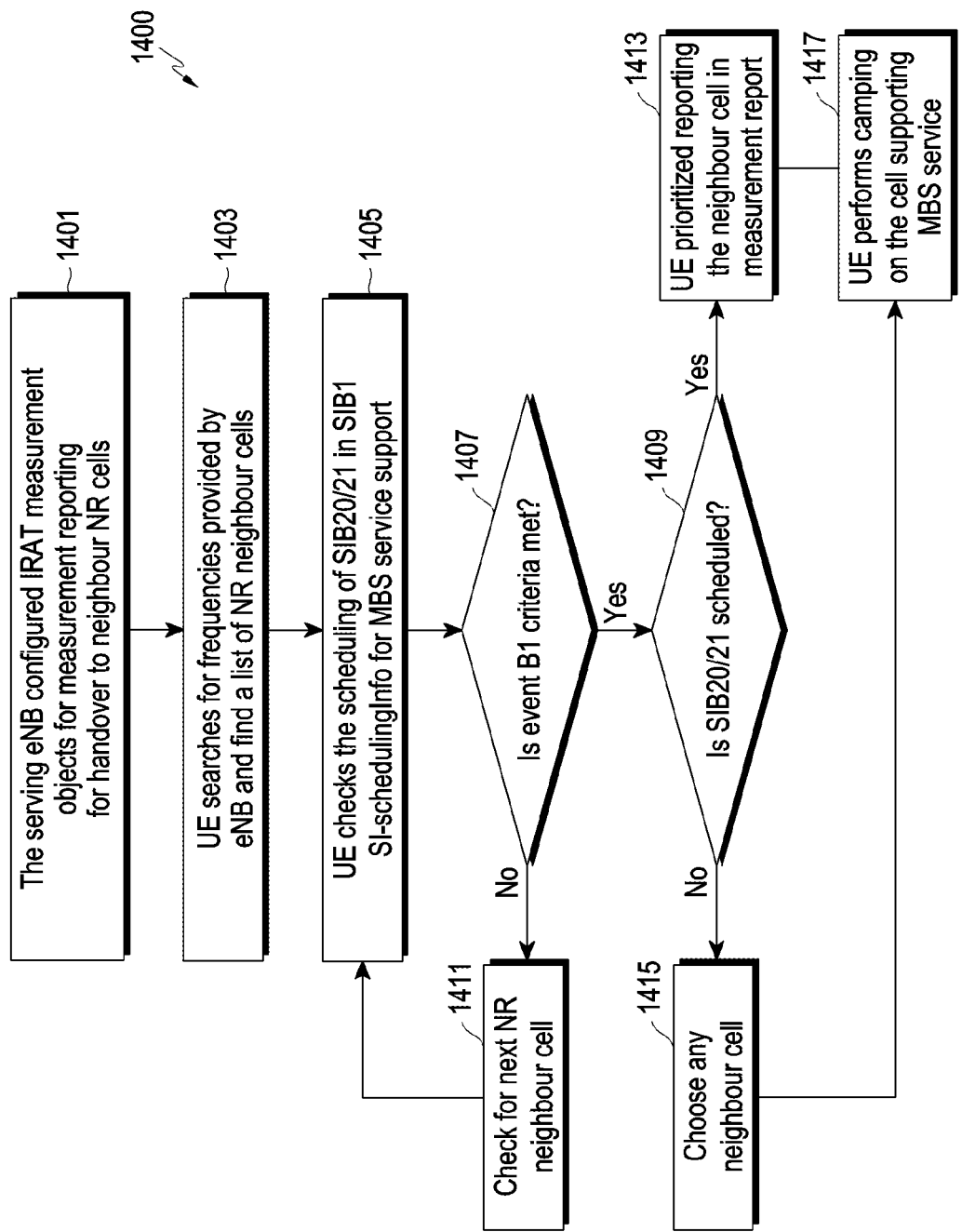
FIG. 14B illustrates a flow chart depicting a method for cell IRAT handover for a UE supporting MBS, in accordance with an example embodiment.

FIG. 14(a) illustrates a signal flow diagram for initiating cell IRAT handover for a UE supporting MBS, in accordance with an example embodiment. FIG. 14(b) illustrates a flow chart depicting a method 1400 for cell IRAT handover for a UE supporting MBS, in accordance with an example embodiment. For the sake of brevity, FIGS. 14(a) and 14(b) will be discussed in conjunction with each other. As known in the art, MIB and SIB1 are the minimum required system information in NR to camp on a cell. SIB1 carries the SI scheduling information of other SIB s present in the cell which is being broadcasted by the network.

As shown in FIG. 14(a), for IRAT-Handover, the non-NR serving cell (LTE Cell) configures inter-RAT measurement events (Event B1) of NR frequencies in the RRC Configuration message. The UE performs the measurements of the configured NR frequencies objects to find the neighbour cells, e.g., gNB1 and gNB2, to report to the network through a measurement report. The UE sends a B1 measurement report to the serving cell (e.g., LTE cell) when the event B1 criterion is fulfilled.

In an example embodiment, as shown in FIG. 14A, an MBS preferred UE 1410 is in RRC connected state in another non-NR RAT (e.g., LTE) and for IRAT-Handover at 1431, the non-NR serving cell (e.g., LTE cell) configures inter-RAT measurement events (event B1) of NR frequencies (measurement objects for NR frequencies) in RRC configuration message at 1432. The UE 1410 performs the measurements of the configured NR frequency objects to find the neighbour cells to report to the network through a measurement report at 1433. For all the detected NR neighbour cells, the UE 1410 determines whether MBS support is available or not by checking the SI scheduling information in SIB1 for SIB20/21 at 1434. Based on SIB1 scheduling information contents, MBS preferred UE 1410 knows about the support of SIB20/SIB21 which is an indicator for MBS support. Further, when the MBS preferred UE 1410 identifies a list of NR neighbour cells meeting the event criterion for the IRAT handover at 1435, the UE 1410 prioritizes reporting the cells that support MBS over other cells in the measurement report. It should be noted that the event criterion for IRAT handover is in accordance with the 3GPP standard and is known to a person skilled in the art. Thus, the UE 1410 uses both measured signal strength and MBS support of the cell for sending measurement reports. Further, the LTE serving cell evaluates the measurement reports for NR cells sent by the UE 1410 and sends MobilityFromEUTRACommand to a cell that supports MBS in the RRC configuration message at 1436 to 11437. This helps the UE 1410 to get MBS connectivity. Hence, in an embodiment, the UE is able to get MBS during the IRAT handover at 1438.

Referring to FIG. 14B, at operation 1401, the serving gNB configures IRAT measurement objects for measurement reporting for handover to neighbour NR cells. Then, at operation 1403, the UE searches for frequencies provided by eNB and finds a list of neighbour cells during measurement, e.g., gNB1 and gNB2. As shown in FIG. 14A, gNB2 1422 supports MBS while gNB1 1421 does not support MBS. Thereafter, at operation 1405, the UE checks the scheduling of SIB20/21 in SIB 1 SI-schedulingInfo for MBS support. Then at operation 1407, the UE determines if the event B1 criterion for the IRAT handover is met or not. If no, then at operation 1411, the UE checks for the next NR neighbour cell. If yes, then at step 1409, the UE checks whether SIB20/SIB21 is present or not for the cell. If yes, then at step 1413, the UE prioritizes reporting the neighbour cell in the measurement report. However, if SIB20/21 is not scheduled for the cell, then at operation 1415, the UE chooses any neighbour cell from the available cells. Then, at operation 1417, the UE performs camping on the cell supporting MBS chosen either at operation 1413 or 1415.

Figure 14C:
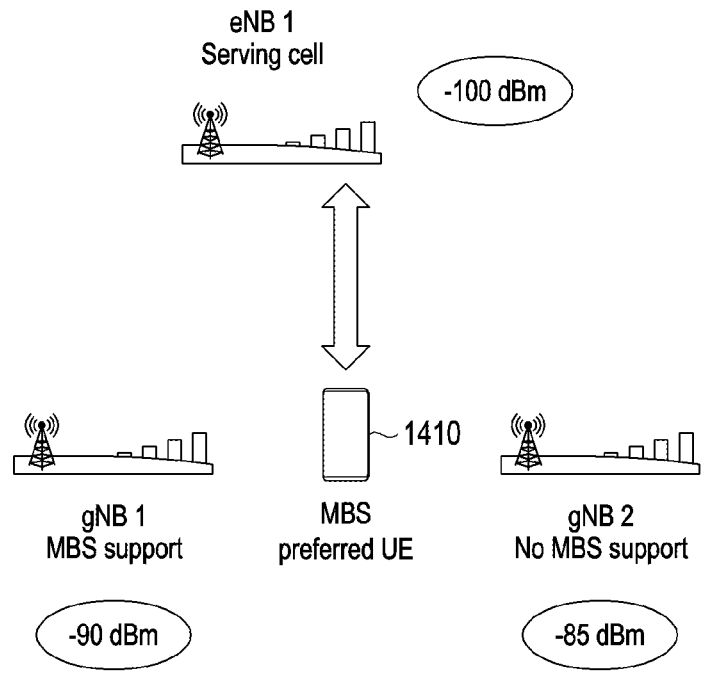
FIGS. 14C, 14D, and 14E illustrate an initial condition of the UE looking for cell IRAT handover and cell IRAT handover using existing art and examples in the present disclosure respectively, in accordance with an example embodiment.
Figure 14D:
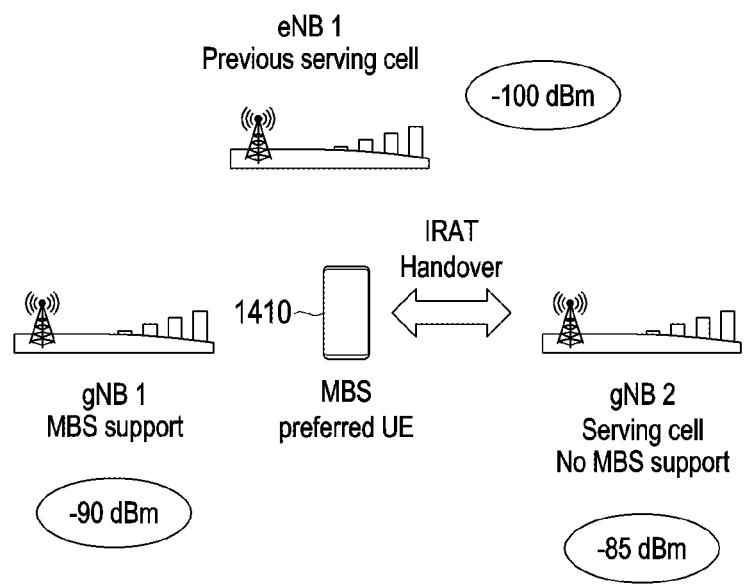
Figure 14E:
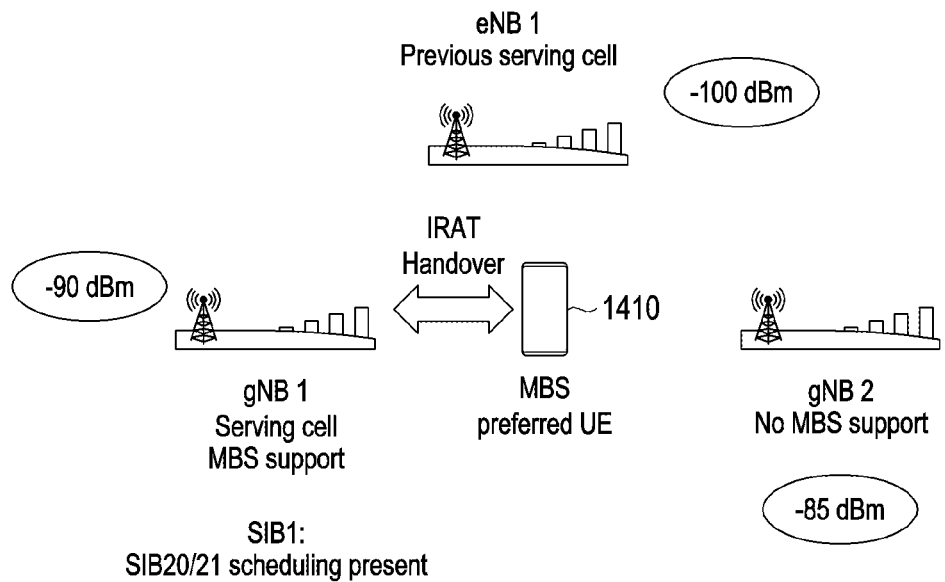

FIGS. 14C to 14E illustrates an initial condition of the UE looking for cell IRAT handover and cell IRAT handover using existing art and examples in the present disclosure respectively, in accordance with an example embodiment. As shown in FIG. 14C, initially the UE 1410 is connected under the following conditions:

TABLE 13

| Neighbor Cells | Signal Level | Cell Suitability | MBS Support (SIB20/21 in SIB1) |
|---|---|---|---|
| gNB1 | −90 dBm | Satisfied | Yes |
| gNB2 | −85 dBm | Satisfied | No |

As shown in FIG. 14D, the UE 1410 initiates cell IRAT handover in accordance with existing art, as shown in below table 14:

TABLE 14

| Neighbor Cells | Signal Level | IRAT Handover Target Cell | MBS Support (SIB20/21 in SIB1) |
|---|---|---|---|
| gNB1 | −90 dBm | Non-Serving Cell | Yes |
| gNB2 | −85 dBm | IRAT Handover Command, Serving Cell | No |

As can be seen from table 14 and FIG. 14D, the UE 1410 camps on the cell based on signal strength, e.g., gNB2 and MBS availability are not checked.

As shown in FIG. 14E, the UE 1410 initiates cell IRAT handover in accordance with an example embodiment, as shown in below table 15:

TABLE 15

| Neighbor Cells | Signal Level | IRAT Handover Target Cell | MBS Support (SIB20/21 in SIB1) |
|---|---|---|---|
| gNB1 | −90 dBm | IRAT Handover Command Serving Cell | Yes |
| gNB2 | −85 dBm | Non-Serving Cell | No |

As evident from table 15 and FIG. 14E, in an example embodiment, the UE 1410 checks the presence of SIB20/21 from SIB1 SI to check the MBS support and prioritizes measurement report for cells with MBS support, e.g., cell gNB1.

Further, it should be noted that FIGS. 14A to 14E have been explained considering the IRAT handover from LTE to NR. However, handover from any other 3GPP RAT to NR is also possible, in accordance with the techniques of various example embodiments.

In a further embodiment, when the UE identifies two suitable cells, a cell with MBS support and a cell without MBS support, the UE can compare the signal strength of both cells. For example, let us consider that the UE has identified two suitable cells, e.g., a first candidate cell and a second candidate cell, where the first candidate cell supports MBS, and the second candidate cell does not support MBS. Then, the UE may determine a difference between the signal strength of the first candidate cell and the second candidate cell. If the difference is below a predetermined threshold, then the UE may initiate one of the plurality of cell transition activities using the second candidate cell. However, if the difference is above the predetermined threshold, then the UE may initiate one of the plurality of cell transition activities using the first candidate cell. It should be noted that the predetermined threshold is configurable. In an embodiment, the predetermined threshold may be configured based on the criterion that the RSRP of a cell that does not support MBS should be better than 10% more than the MBS supported cell for UE to choose this cell over MBS supported cell. Based on this criterion, during poor signal conditions, the threshold difference value is low and during good signal conditions, the threshold value is high. For example, as shown in below table 16, the UE prefers gNB2, a cell with MBS support on RSRP comparison after threshold addition:

TABLE 16

| Cell | MBS support | RSRP | Converted RSRP |
|---|---|---|---|
| gNB2 | Supported | −70 | (−70 − (−156)) + 0.1 (−70 − (−156)) = 105 |
| gNB3 | Not Supported | −62 | (−62 − (−156)) = 104 |

In another example, as shown in below table 17, the UE prefers gNB3, a cell without MBS support based on RSRP comparison after threshold addition:

TABLE 17

| Cell | MBS support | RSRP | Converted RSRP |
|---|---|---|---|
| gNB2 | Supported | −100 | (−100 − (−156)) + 0.1 (−100 − (−156)) = 62 |
| gNB3 | Not Supported | −92 | (−90 − (−156)) = 64 |

In an exemplary embodiment, the cells have been chosen using below equation 1:

Cell to Choose=Maximum((gNB2 RSRP−(−156)+ Threshold),(gNB3 RSRP−(−156)))

Threshold=0.1 (RSRP of gNB2−(−156))

It should be noted that the value −156 is taken to convert RSRP to a positive value as it is the lowest RSRP value reported in NR.

Further, it should be noted that even though the above examples have been explained using two candidate cells only, it is possible that the UE may compare the signal strength of more than two candidate cells and then choose a cell for initiation of one of the cell transition activities.

Hence, in this embodiment, the UE prioritizes cells based on both MBS support and signal strength conditions. As a result, unnecessary radio link failure (RLF), and Ping-Pong effects could be avoided. Hence, the MBS supported cell is given more preference during good signal conditions and during poor signal conditions, cells with better signal strength are given higher preference. This results in achieving a balance between the MBS supported cells and good signal cells.

In a further embodiment, if multiple candidate cells support MBS such as a first candidate cell and a second candidate cell, then the UE may prioritize cells based on at least one of better RSRP, support of Release-16 Relaxed Measurement, and better Bandwidth. This ensures that the UE selects the best suitable cell even among the multiple MBS supported cells. Hence, in an embodiment, the UE may determine the first candidate cell and a second candidate cell, wherein each of the first candidate cell and the second candidate cell support MBS. Then, the UE may determine whether one of the first candidate cell and the second candidate cell supports a relaxed measurement feature. Then, the UE may initiate one of the plurality of cell transition activities using the cell which supports the relaxed measurement feature. In an embodiment, the UE may also initiate one of the plurality of cell transition activities using the cell which has better RSRP and/or better bandwidth. For example, as shown in below table 18, the UE prioritizes gNB3 for cell transition activity as it supports a relaxed measurement feature and has better signal strength and bandwidth.

TABLE 18

| Candidate cells | Signal Level | Bandwidth | MBS Support | Relax Measurement |
|---|---|---|---|---|
| gNB2 | −95 dB | 10 MHz | Supported | Not Supported |
| gNB3 | −90 dB | 20 MHZ | Supported | Supported |

Further, it should be noted that even though the above examples have been explained using two candidate cells only, it is possible that the UE may determine prioritization between more than two candidate cells.

Figure 15:
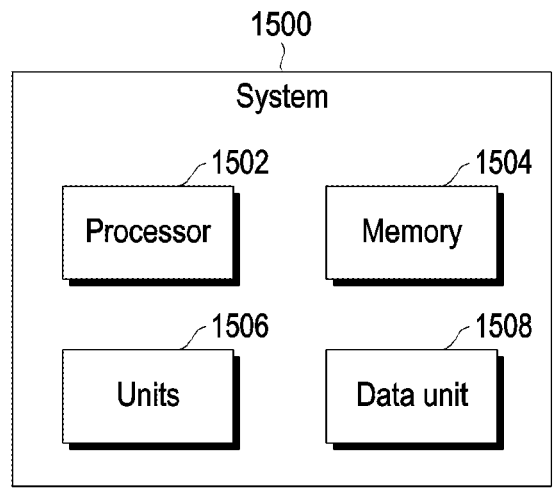
FIG. 15 illustrates a block diagram of a system for initiating one of a plurality of cell transition activities for a UE supporting MBS, in accordance with an example embodiment.

FIG. 15 illustrates a block diagram of a system for initiating one of a plurality of cell transition activities for the UE supporting MBS, in accordance with an example embodiment. It should be noted that the system 1500 may be a part of a UE. In another embodiment, the system 1500 may be connected to the UE. The system 1500 may include, but is not limited to, at least one processor 1502, memory 1504, units 1506, and data unit 1508. The units 1506 and the memory 1504 may be coupled to the processor 1502. The system 1500 may be configured to perform methods as discussed in reference to FIG. 9-14E. Each processor herein comprises processing circuitry.

The processor 1502 can be a single processing unit or several units, all of which could include multiple computing units. The processor 1502 may be implemented as one or more microprocessors, microcomputers, microcontrollers, digital signal processors, central processing units, state machines, logic circuitries, and/or any devices that manipulate signals based on operational instructions. Among other capabilities, the processors 1502 are configured to fetch and execute computer-readable instructions and data stored in the memory 1504, respectively.

The memory 1504 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The units 1506 amongst other things include routines, programs, objects, components, data structures, etc., which perform particular tasks or implement data types. The units 1506 may also be implemented as, signal processor(s), state machine(s), logic circuitries, and/or any other device or component that manipulates signals based on operational instructions. "Based on" as used herein covers based at least on.

Further, the units 1506 can be implemented in hardware, instructions executed by a processing unit, or by a combination thereof. The processing unit can comprise a computer, a processor, such as the processor 1502, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another embodiment, the units 1506 may be machine-readable instructions (software) that, when executed by a processor/processing unit, perform any of the described functionalities.

The data unit 1508 serves, amongst other things, as a repository for storing data processed, received, and generated by one or more of the units 1506, respectively.

Accordingly various example embodiments may provide one or more of the following advantages:

The disclosed techniques are very much useful for the MBS preferred UEs to select the cell based on MBS support provided by the cell. In accordance with the disclosed techniques, MBS preferred devices get MBS more consistently with few disruptions resulting in a good user experience.

In accordance with the disclosed techniques, MBS preferred UEs use multicast service resulting in better spectrum/resource utilization as UE uses common multicast frequencies instead of dedicated resources.

Unless otherwise defined, all technical and scientific terms used herein have the same meaning as commonly understood by one of ordinary skilled in the art. The system, methods, and examples provided herein are illustrative only and not intended to be limiting.

Benefits, other advantages, and solutions to problems have been described above with regard to specific embodiments. However, the benefits, advantages, solutions to problems and any component(s) that may cause any benefit, advantage, or solution to occur or become more pronounced are not to be construed as a critical, required, or essential feature or component of any or all the claims.

While specific language has been used to describe the present subject matter, any limitations arising on account thereto, are not intended. As would be apparent to a person in the art, various working modifications may be made to the method in order to implement examples taught herein. The drawings and the foregoing description give examples of embodiments. Those skilled in the art will appreciate that one or more of the described elements may well be combined into a single functional element or embodiment. Alternatively, certain elements may be split into multiple functional elements. Elements from any embodiment may be added to another embodiment.

What is claimed is:

1. A method for initiating a cell transition activity, of a plurality of cell transition activities, for a user equipment (UE) supporting multicast and broadcast services (MBS), the method comprising:
   identifying, by the UE, one or more candidate cells available for the cell transition activity of the plurality of cell transition activities for the UE;
   identifying, by the UE, at least one candidate cell among the one or more candidate cells based on detecting a system information (SI) scheduling information for system information block 20 (SIB20) or a system information block 21 (SIB21) in a system information block 1 (SIB1) received from the one or more candidate cells, wherein the at least one candidate cell supports MBS; and
   initiating, by the UE, a cell transition activity of the plurality of cell transition activities for the UE using the at least one candidate cell.

2. The method as claimed in claim 1, wherein the plurality of cell selection cell transition activities include cell selection, cell reselection, cell redirection, handover, and inter-radio access technology (IRAT) handover.

3. The method as claimed in claim 1, wherein prior to initiating the cell transition activity of the plurality of cell transition activities, the method comprises:
   determining if the at least one candidate cell satisfies an event criterion associated with the cell transition activity of the plurality of cell transition activities; and
   identifying another candidate cell among the one or more candidate cells that supports MBS, if the at least one candidate cell does not satisfy the event criterion.

4. The method as claimed in claim 1, wherein initiating the cell transition activity of the plurality of cell transition activities for the UE comprises camping on the at least one candidate cell, when the cell transition activity of the plurality of cell transition activities comprises a cell selection and/or a cell redirection.

5. The method as claimed in claim 1, wherein initiating the cell transition activity of the plurality of cell transition activities comprises reselecting to the at least one candidate cell, when the cell transition activity of the plurality of cell transition activities comprises a cell reselection.

6. The method as claimed in claim 1, wherein identifying the one or more candidate cells comprises identifying the one or more candidate cells from a list of neighbor cells provided by a network, when the cell transition activity of the plurality of cell transition activities is measurement reporting for a handover and/or an IRAT handover.

7. The method as claimed in claim 1, wherein initiating the cell transition activity of the plurality of cell transition activities comprises prioritizing performing of measurement for the at least one candidate cell, when the cell transition activity of the plurality of cell transition activities comprises a handover and/or an IRAT handover.

8. The method as claimed in claim 1, further comprising:
   determining at least a first candidate cell and a second candidate cell among the one or more candidate cells for the cell transition activity of the plurality of cell transition activities for the UE, wherein the first candidate cell supports MBS, and the second candidate cell does not support MBS;
   determining a difference between a signal strength of the first candidate cell and the second candidate cell; and
   initiating the cell transition activity of the plurality of cell transition activities using the second candidate cell, when the difference is below a predetermined threshold.

9. The method as claimed in claim 1, further comprising:
determining at least a first candidate cell and a second candidate cell among the one or more candidate cells, wherein each of the first candidate cell and the second candidate cell support MBS;
determining whether one of the first candidate cell and the second candidate cell supports a relaxed measurement feature; and
initiating the cell transition activity of the plurality of cell transition activities using one of the first candidate cell and the second candidate cell supporting the relaxed measurement feature.

10. A user equipment (UE) for initiating a cell transition activity of a plurality of cell transition activities for the UE supporting multicast and broadcast services (MBS), the UE comprising:
memory storing instructions; and
at least one processor coupled to the memory,
wherein the instructions, when executed by the at least one processor cause the UE to: identify one or more candidate cells available for the cell transition activity of the plurality of cell transition activities for the UE;
identify at least one candidate cell among the one or more candidate cells based on detecting a system information (SI) scheduling information for system information block 20 (SIB20) or a system information block 21 (SIB21) in a system information block 1 (SIB1) received from the one or more candidate cells, wherein the at least one candidate cell supports MBS and the SI scheduling information; and
initiate the cell transition activity of the plurality of cell transition activities for the UE using the at least one candidate cell.

11. The UE as claimed in claim 10, wherein the plurality of cell selection activities include cell selection, cell reselection, cell redirection, handover, and Inter-Radio Access Technology (IRAT) handover.

12. The UE as claimed in claim 10, wherein the instructions, when executed by the at least one processor cause the UE to:
determine if the at least one candidate cell satisfies an event criterion associated with the cell transition activity of the plurality of cell transition activities; and
identify another candidate cell among the one or more candidate cells that supports MBS, if the at least one candidate cell does not satisfy the event criterion.

13. The UE as claimed in claim 10, wherein the instructions, when executed by the at least one processor cause the UE to camp on the at least one candidate cell for initiating the cell transition activity of the plurality of cell transition activities for the UE, when the cell transition activity of the plurality of cell transition activities is one of a cell selection and a cell redirection.

14. The UE as claimed in claim 10, wherein the instructions, when executed by the at least one processor cause the UE to reselect to the at least one candidate cell for initiating the cell transition activity of the plurality of cell transition activities, when the cell transition activity of the plurality of cell transition activities is a cell reselection.

15. The UE as claimed in claim 10, wherein the instructions, when executed by the at least one processor cause the UE to identify one or more candidate cells from a list of neighbor cells provided by a network, when the cell transition activity of the plurality of cell transition activities is measurement reporting for a handover and/or an IRAT handover.

16. The UE as claimed in claim 10, wherein the instructions, when executed by the at least one processor cause the UE to prioritize performing of measurement for the at least one candidate cell for initiating the cell transition activity of the plurality of cell transition activities, when the cell transition activity of the plurality of cell transition activities is a handover and/or an IRAT handover.

17. The UE as claimed in claim 10, wherein the instructions, when executed by the at least one processor cause the UE to:
determine at least a first candidate cell and a second candidate cell among the one or more candidate cells for the cell transition activity of the plurality of cell transition activities for the UE, wherein the first candidate cell supports MBS, and the second candidate cell does not support MBS;
determine a difference between a signal strength of the first candidate cell and the second candidate cell; and
initiate the cell transition activity of the plurality of cell transition activities using the second candidate cell, when the difference is below a predetermined threshold.

18. The UE as claimed in claim 10, wherein the instructions, when executed by the at least one processor cause the UE to:
determine at least a first candidate cell and a second candidate cell among the one or more candidate cells, wherein each of the first candidate cell and the second candidate cell support MBS;
determine whether one of the first candidate cell and the second candidate cell supports a relaxed measurement feature; and
initiate the cell transition activity of the plurality of cell transition activities using one of the first candidate cell and the second candidate cell supporting the relaxed measurement feature.

* * * * *